United States Patent
Zhang

(10) Patent No.: US 11,647,862 B2
(45) Date of Patent: May 16, 2023

(54) STEAM-TYPE AIR FRYER

(71) Applicant: NINGBO CARELINE ELECTRIC APPLIANCE CO., LTD., Ningbo (CN)

(72) Inventor: Yichi Zhang, Ningbo (CN)

(73) Assignee: NINGBO CARELINE ELECTRIC APPLIANCE CO., LTD., Ningbo (CN)

( * ) Notice: Subject to any disclaimer, the term of this patent is extended or adjusted under 35 U.S.C. 154(b) by 170 days.

(21) Appl. No.: 17/147,440

(22) Filed: Jan. 12, 2021

(65) Prior Publication Data

US 2022/0053973 A1    Feb. 24, 2022

(30) Foreign Application Priority Data

Aug. 19, 2020 (CN) .......................... 202010836731.5
Aug. 19, 2020 (CN) .......................... 202021735617.5
Aug. 19, 2020 (CN) .......................... 202021736515.5
Aug. 24, 2020 (CN) .......................... 202021772368.7
Aug. 24, 2020 (CN) .......................... 202021772386.5

(51) Int. Cl.
*A47J 37/00* (2006.01)
*A47J 37/06* (2006.01)
*A47J 27/04* (2006.01)

(52) U.S. Cl.
CPC .......... *A47J 37/0641* (2013.01); *A47J 27/04* (2013.01); *A47J 2027/043* (2013.01)

(58) Field of Classification Search
CPC .. A47J 37/0641; A47J 27/04; A47J 2027/043; F24C 15/32; F24C 15/322; F24C 15/325; F24C 15/327; B65D 47/123

USPC ............................................................ 99/403
See application file for complete search history.

(56) References Cited

U.S. PATENT DOCUMENTS

2018/0340695 A1 * 11/2018 Park ................... F24C 15/006
2019/0387922 A1 * 12/2019 Jin ........................ A47J 27/00

FOREIGN PATENT DOCUMENTS

| CN | 105902142 A | * | 8/2016 | ............ A47J 27/004 |
| CN | 106724880 A | * | 5/2017 | |
| CN | 108523692 A | * | 9/2018 | |
| CN | 110558832 A | * | 12/2019 | .............. A47J 27/04 |
| CN | 110876559 A | * | 3/2020 | |
| CN | 111214131 A | * | 6/2020 | |

(Continued)

*Primary Examiner* — Jimmy Chou
*Assistant Examiner* — Thao Uyen Tran-Le
(74) *Attorney, Agent, or Firm* — Platinum Intellectual Property PC

(57) ABSTRACT

Disclosed is a steam-type air fryer, including: an air outlet structure, including a body shell, the body shell is provided therein with a cooking cavity, a steam generator in the body shell generates hot steam which is introduced into the cooking cavity, the cooking cavity is provided with an air outlet hole for discharging residual steam, a cold wind passage into which external cold air enters is formed between the cooking cavity and the body shell; and a water inlet structure, including an air fryer main body, an upper end of the air fryer main body is provided with a water tank seat, the water tank seat is detachably provided with a water tank, wherein the water tank is provided therein with a water outlet seat extending upward, the water tank seat is provided with a water outlet pipe corresponding to the water outlet seat.

19 Claims, 17 Drawing Sheets

(56) References Cited

FOREIGN PATENT DOCUMENTS

CN 210930956 U * 7/2020
JP 6409250 B1 * 10/2018

* cited by examiner

STEAM-TYPE AIR FRYER

CROSS-REFERENCE TO RELATED APPLICATIONS

The present disclosure claims the priority to the Chinese patent application with the filing number 202010836731.5, filed on Aug. 19, 2020 with the Chinese Patent Office, and entitled "Air Outlet Structure of Air Fryer Having Steaming Function", the Chinese patent application with the filing number 202021736515.5, filed on Aug. 19, 2020 with the Chinese Patent Office, and entitled "Air Fryer Ensuring Food Clean", the Chinese patent application with the filing number 202021735617.5, filed on Aug. 19, 2020 with the Chinese Patent Office, and entitled "Steam-type Air Fryer with High Thermal Efficiency", the Chinese patent application with the filing number 202021772386.5, filed on Aug. 24, 2020 with the Chinese Patent Office, and entitled "Water Inlet Structure of Steam-type Air Fryer", and the Chinese patent application with the filing number 202021772368.7, filed on Aug. 24, 2020 with the Chinese Patent Office, and entitled "Steam Inlet Structure of Steam-type Air Fryer", the contents of which are incorporated herein by reference in entirety.

TECHNICAL FIELD

The present disclosure relates to the field of air fryers, and in particular, to a steam-type air fryer, and more particularly, to a steam-type air fryer including an air outlet structure, a water inlet structure and a steam inlet structure with high thermal efficiency and capable of ensuring food clean.

BACKGROUND ART

Air fryers are kitchen appliances that are now favorite. The existing air fryers generally only have an air frying function, then the form of cooking food is relatively single, which cannot satisfy the diversified demands of users. Hence, a steam-type air fryer appears on the current market, with both functions of air frying and steam cooking, but there are generally the following problems:

1) residual steam easily burns the user due to a high temperature when being discharged, besides, condensate water is easily formed and attached to an outer wall of a housing of the steam-type air fryer and flows to a worktop, thereby affecting safety and user's use experience;

2) the steam-type air fryer having a steam cooking function is generally mounted with a water tank, but the water tank is likely to leak water during disassembling and assembling, while if a water stop valve is added, the structure of the water tank will be relatively complex, the cost is relatively high, and the maintenance rate is also relatively high;

3) current steam-type air fryers mostly adopt a drawer-type frying basket to hold food, but they have a problem, that is, the drawer-type frying basket needs to be drawn off the steam-type air fryer, so how to directly introduce steam into the drawer-type frying basket is a problem that needs to be solved;

4) the thermal efficiency of a steam generator is not high, then heat is wasted; and 5) when the steam function is adopted, there will be steam condensate water at the bottom of a frying pot body, and when the food in the frying pot is poured out, the food may be contaminated, then the user's experience is poor.

Summary

A technical solution of the present disclosure is as follows:

a steam-type air fryer, including:

an air outlet structure, wherein the air outlet structure includes a body shell, the body shell is provided therein with a cooking cavity, a steam generator in the body shell generates hot steam which is introduced into the cooking cavity, the cooking cavity is provided with an air outlet hole for discharging residual steam, a cold wind passage into which external cold air enters is formed between the cooking cavity and the body shell, wherein the body is provided with an air outlet hood, an air outlet hood seat is mounted at an inner side of the air outlet hood, a steam discharge passage connected to the air outlet hole is provided in the air outlet hood, a cold air passage in communication with the cold wind passage is formed between the air outlet hood and the air outlet hood seat, the cold air passage is arranged around the steam discharge passage, a steam outlet in communication with the steam discharge passage is provided in the middle of the air outlet hood, an air outlet in communication with the cold air passage is provided around the steam outlet, and the steam outlet is provided with a guiding component for guiding high-temperature steam discharged from the steam outlet to the air outlet.

BRIEF DESCRIPTION OF DRAWINGS

In order to more clearly illustrate technical solutions of embodiments of the present disclosure, accompanying drawings which need to be used in the embodiments will be introduced below briefly, and it should be understood that the accompanying drawings below merely show some embodiments of the present disclosure, and therefore should not be considered as limitation to the scope, and a person ordinarily skilled in the art still could obtain other relevant accompanying drawings according to these accompanying drawings, without using any creative effort.

Figure 1:
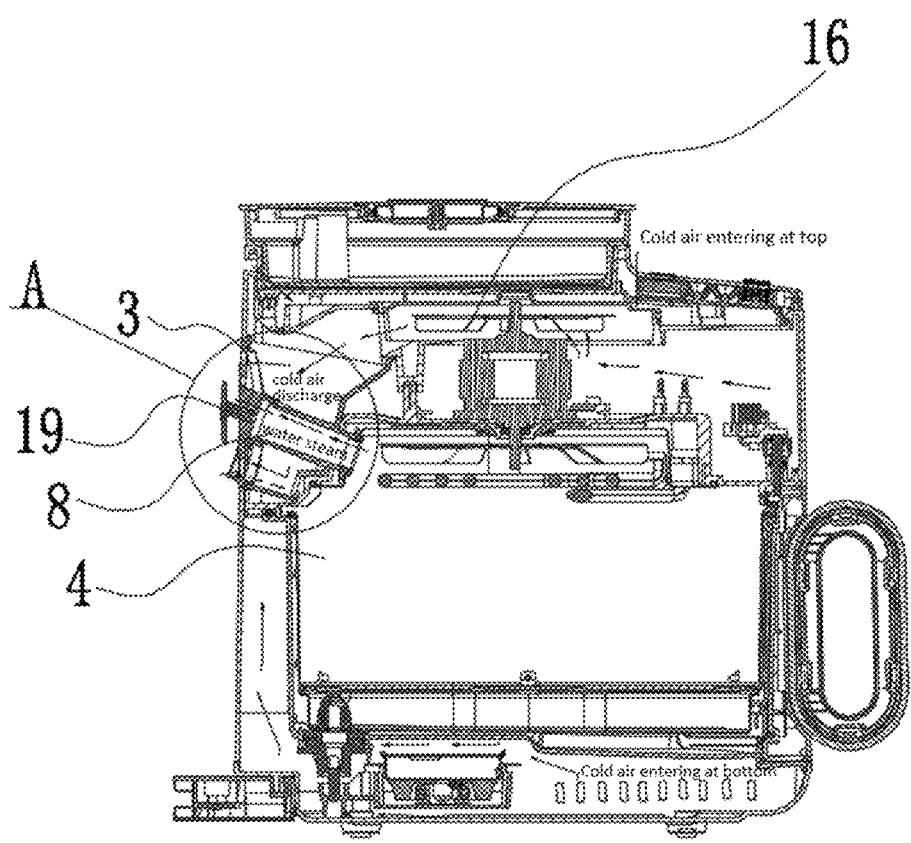
FIG. 1 is a front semi-sectional structural view of an air outlet structure of a steam-type air fryer in the present disclosure.
Figure 2:
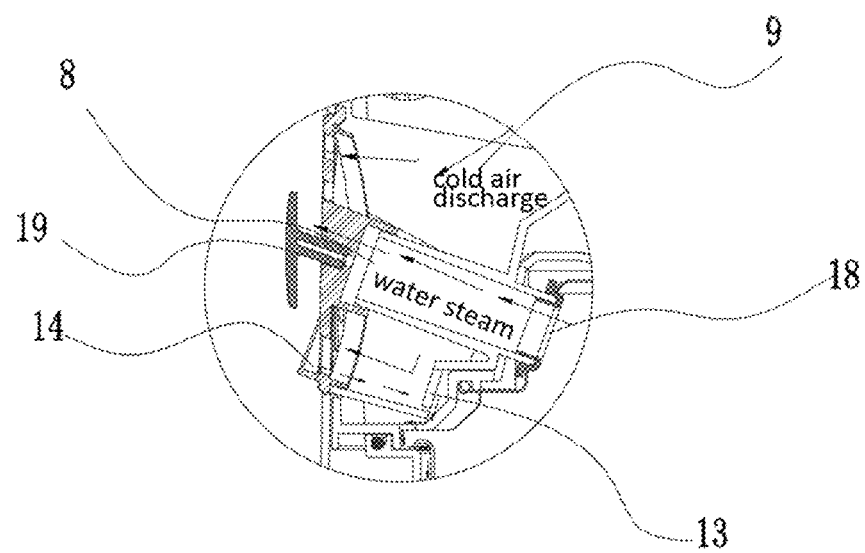
FIG. 2 is an enlarged structural view of a part A in FIG. 1.
Figure 3:
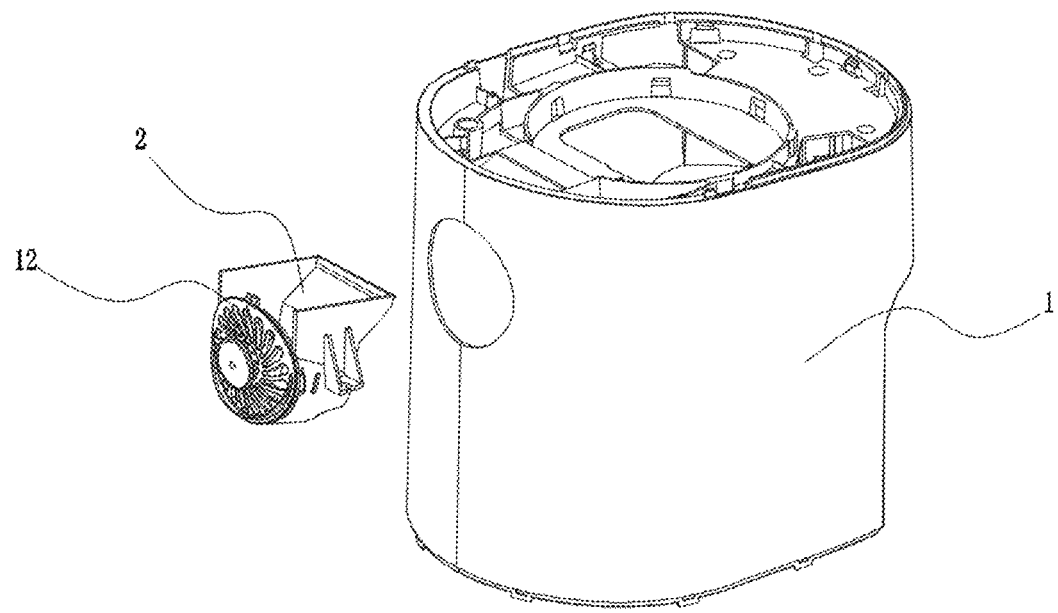
FIG. 3 is an external disassembly structural view of an air outlet structure of the steam-type air fryer in the present disclosure.
Figure 4:
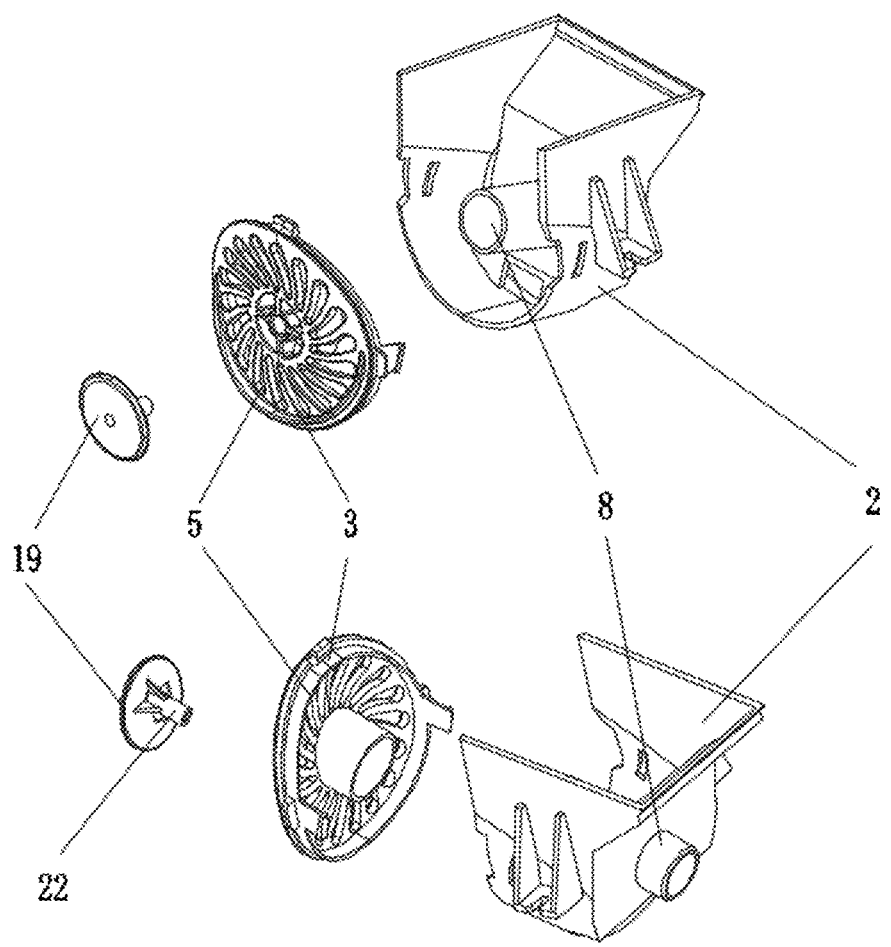
FIG. 4 is an exploded perspective view of an air outlet hood, an air outlet hood seat and a baffle plate of the air outlet structure of the steam-type air fryer in the present disclosure.
Figure 5:
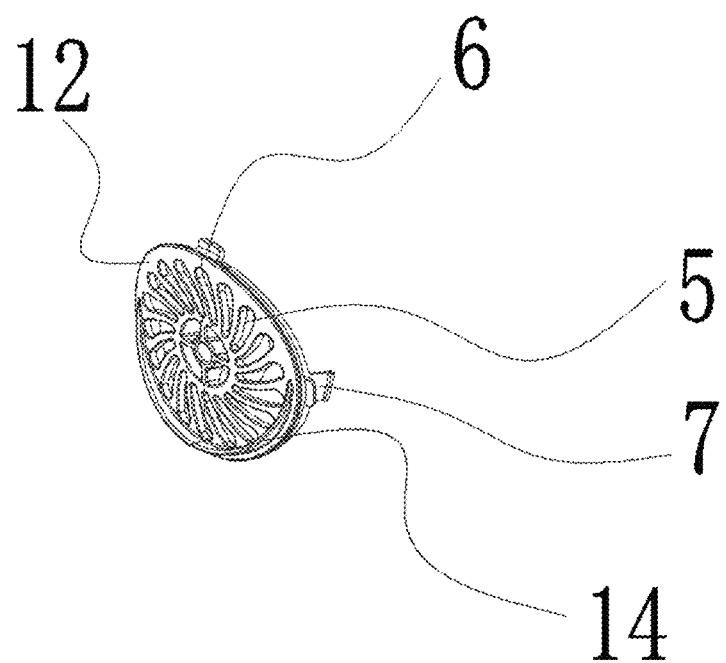
FIG. 5 is a perspective structural view of the air outlet hood of the air outlet structure of the steam-type air fryer in the present disclosure.
Figure 6:
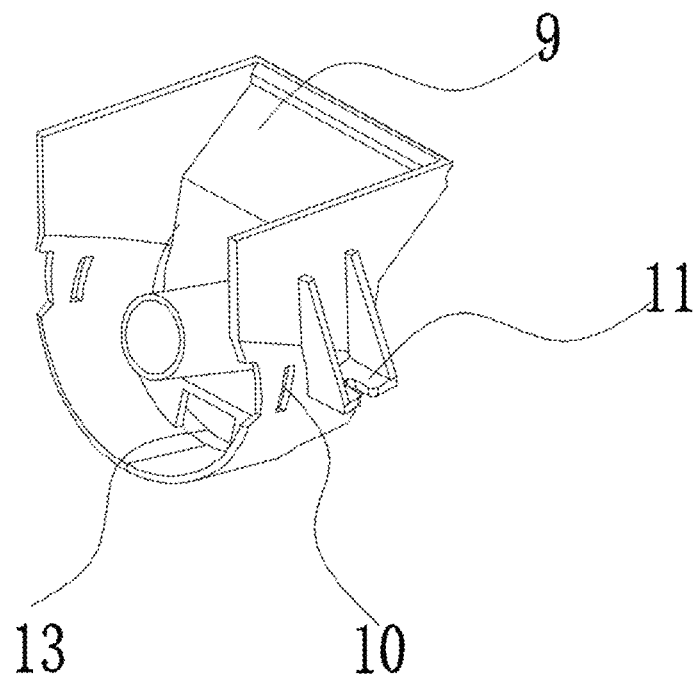
FIG. 6 is a perspective structural view of the air outlet hood seat of the air outlet structure of the steam-type air fryer in the present disclosure.
Figure 7:
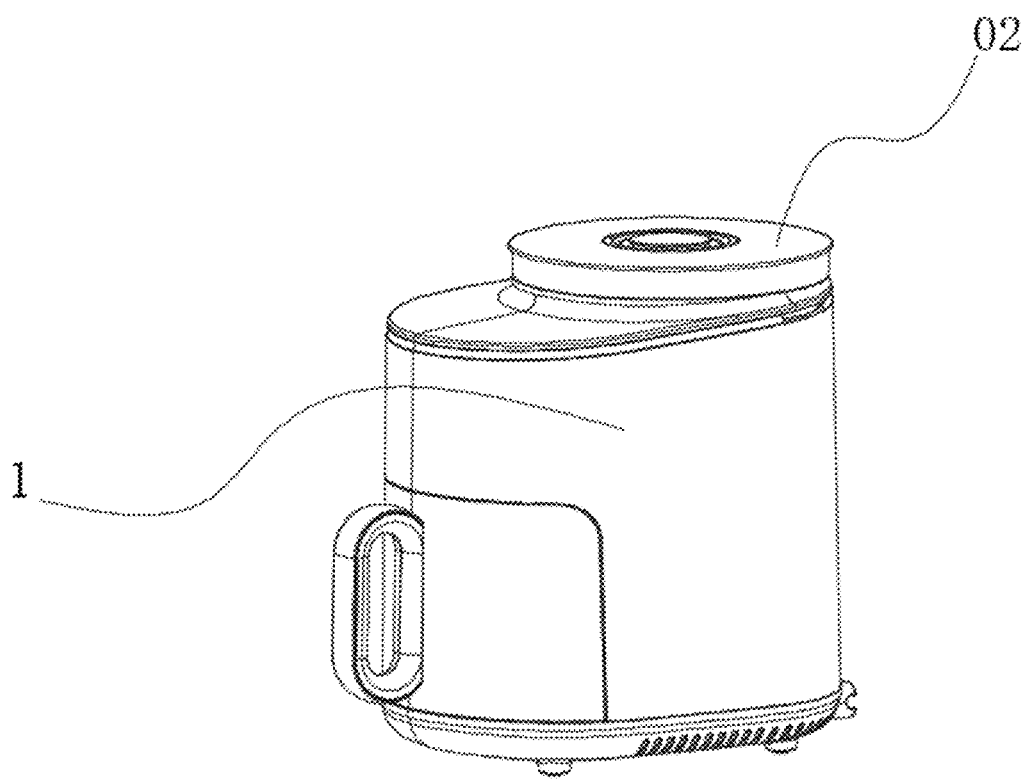
FIG. 7 is a perspective outline structural view of a water inlet structure of the steam-type air fryer in the present disclosure.
Figure 8:
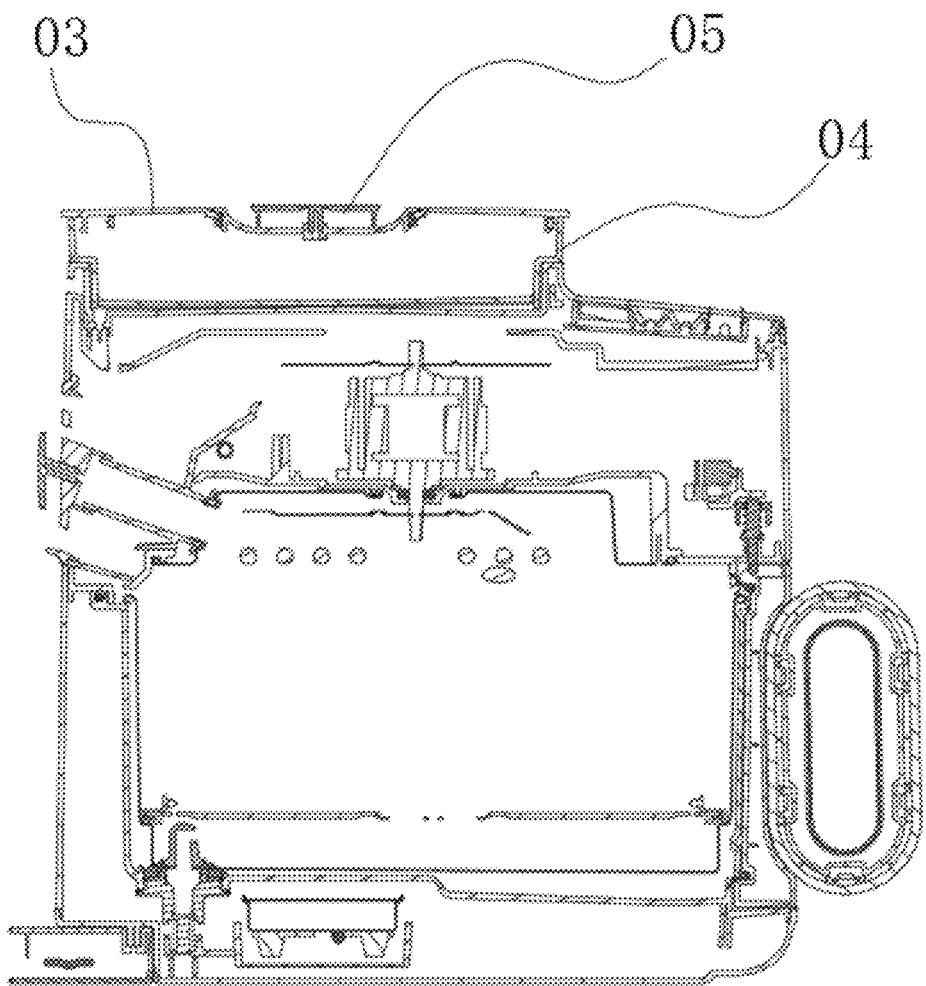
FIG. 8 is a front semi-sectional structural view of the water inlet structure of the steam-type air fryer in the present disclosure.
Figure 9:
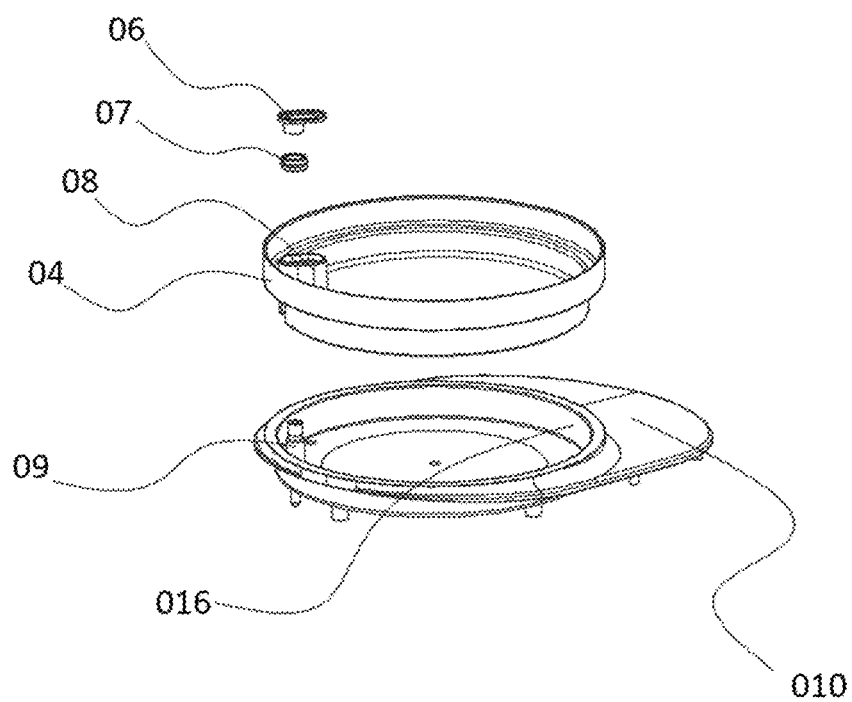
FIG. 9 is an exploded structural view of the water inlet structure of the steam-type air fryer in the present disclosure.
Figure 10:
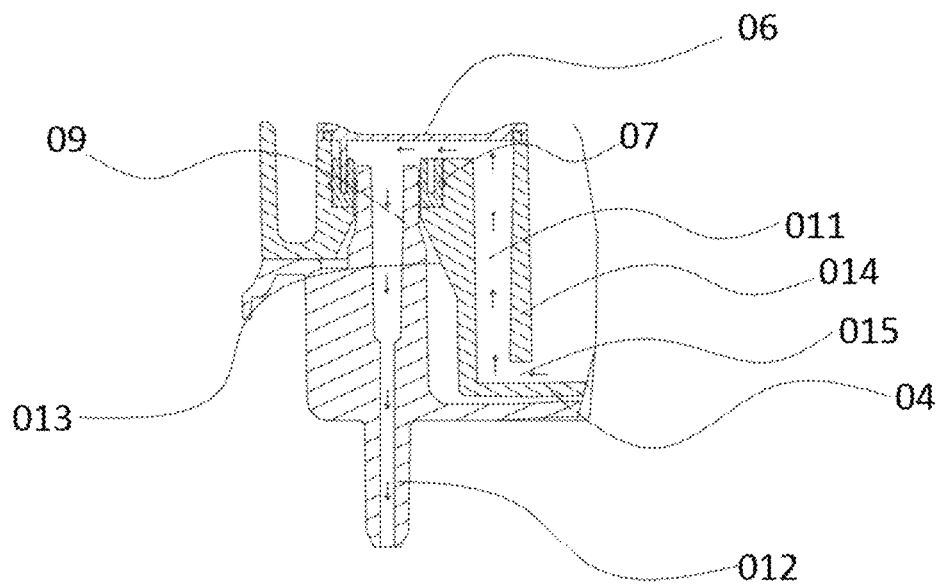
FIG. 10 is a partial sectional structural view of the water inlet structure of the steam-type air fryer in the present disclosure.
Figure 11:
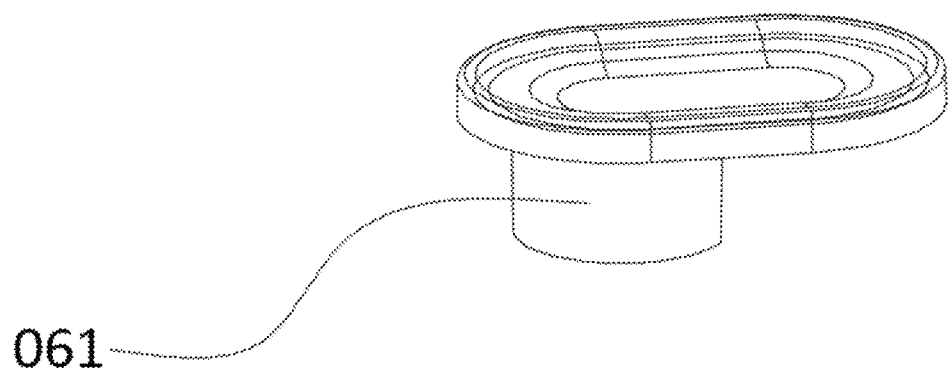
FIG. 11 is a structural view of a sealing cover of the water inlet structure of the steam-type air fryer in the present disclosure.
Figure 12:
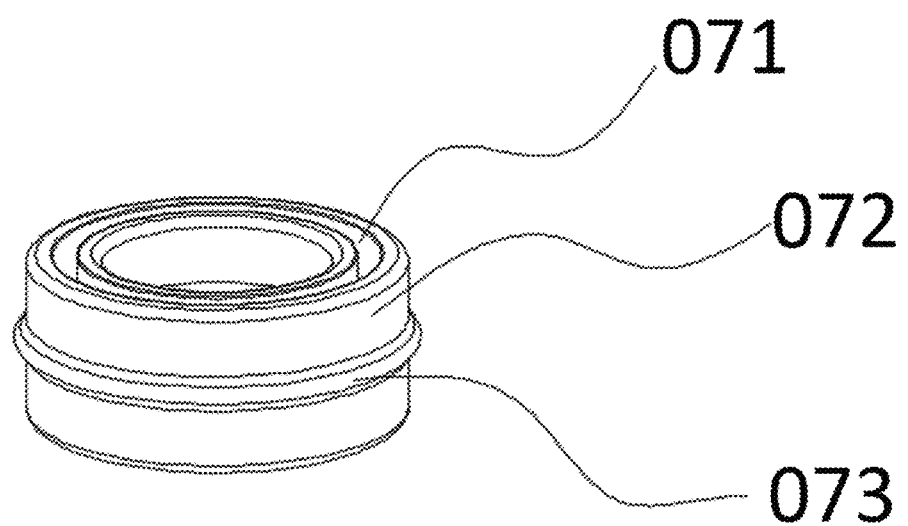
FIG. 12 is a structural view of a sealing gasket of the water inlet structure of the steam-type air fryer in the present disclosure.
Figure 13:
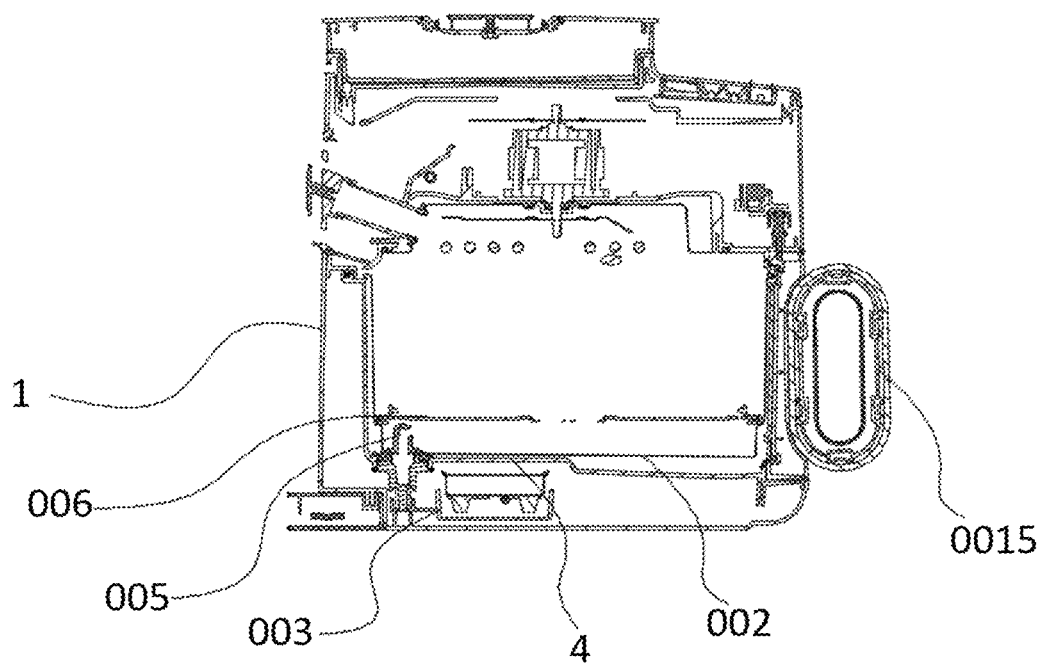
FIG. 13 is a front semi-sectional structural view of a steam inlet structure of the steam-type air fryer in the present disclosure.
Figure 14:
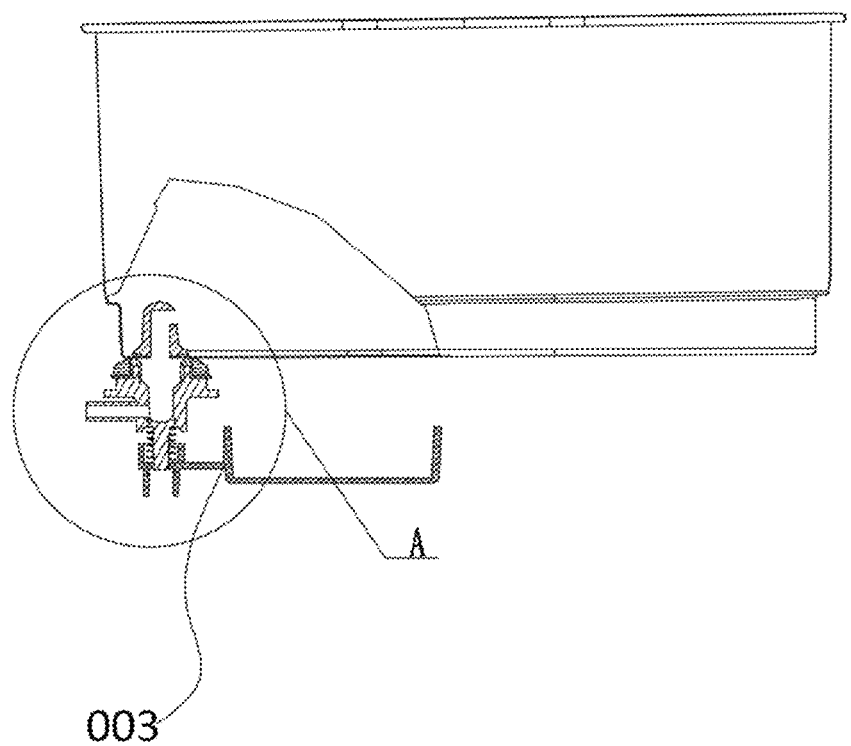
FIG. 14 is a structural view of a spray head in combined state of the steam inlet structure of the steam-type air fryer in the present disclosure.
Figure 15:
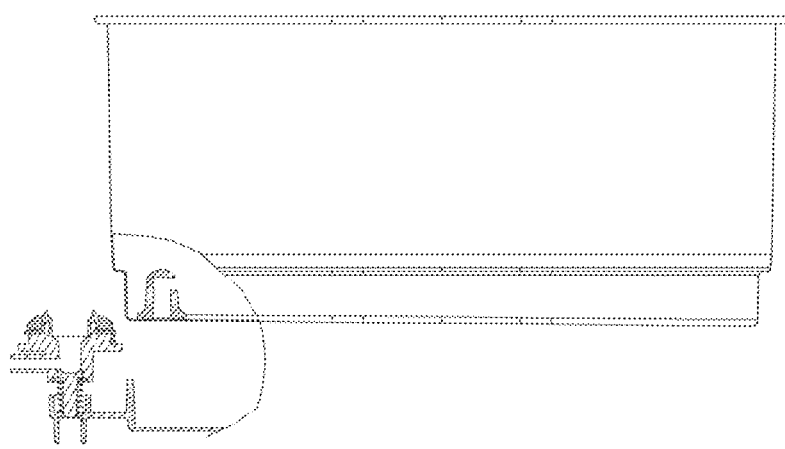
FIG. 15 is a structural view of the spray head in separated state of the steam inlet structure of the steam-type air fryer in the present disclosure.
Figure 16:
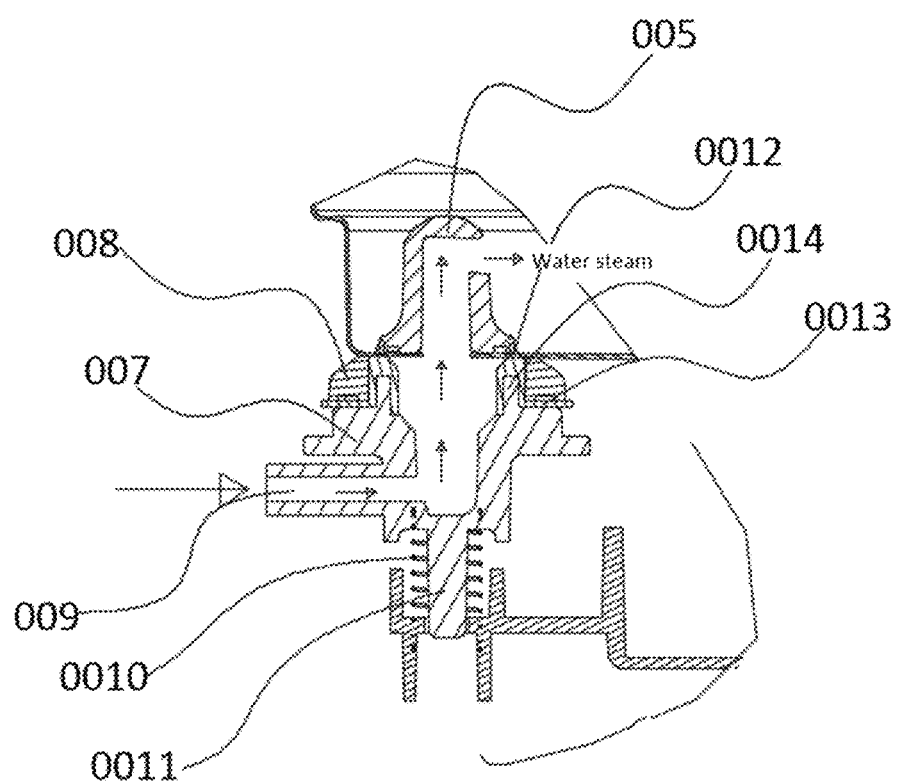
FIG. 16 is an enlarged structural view of a part A in FIG. 14.
Figure 17:
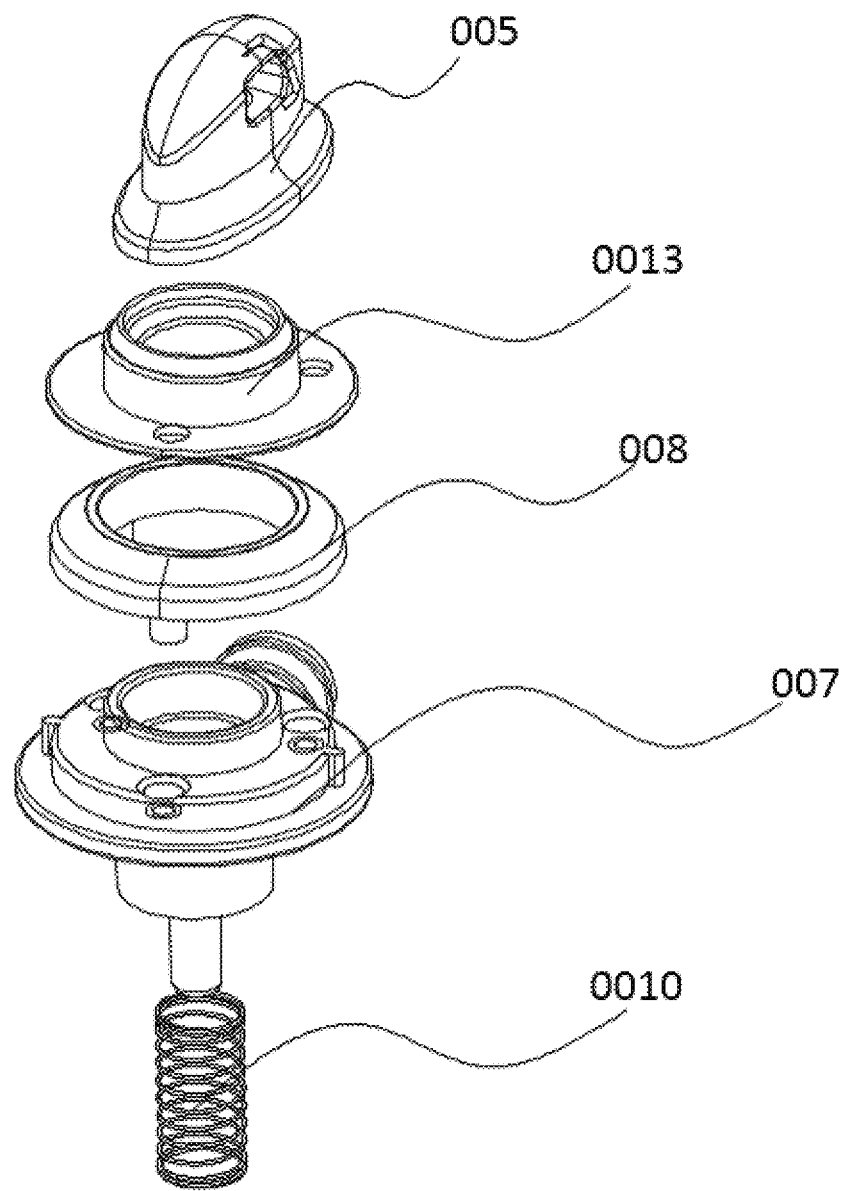
FIG. 17 is a schematic exploded perspective view of a steam inlet seat of the steam inlet structure of the steam-type air fryer in the present disclosure.

Reference signs: 1—body shell (air fryer main body; body); 2—air outlet hood seat; 3 air outlet hood; 4—cooking cavity; 5—air outlet; 6—clamping plate; 7—snap-fit buckle; 8—steam discharge pipe; 9—cold air inlet; 10—clamping groove; 11—mounting lug; 12—mask; 13—drain opening; 14—protruding retainer; 15—air duct plate; 16—cooling fan; 17—cold wind passage; 18—air outlet hole; 19—baffle plate; 22—first connecting post; 02—water inlet structure; 03—cover plate; 04—water tank; 05—water adding cover; 06—sealing cover; 07—sealing gasket; 08—water outlet seat; 09—water outlet pipe; 010—water tank seat; 011—hermetic water outlet passage; 012—water pipe joint; 013—conical side wall; 015—water inlet; 016—convex peripheral rim; 061—position-limiting plate; 071—insertion slot; 072—cylindrical main body; 073—sealing protrusion; 002—drawer-type frying basket (drawer-type frying pot); 003—mounting base; 005—spray head; 006—frying board; 007—steam inlet seat; 008—pressing block; 009—steam inlet pipe; 0010—compression spring; 0011—insertion post; 0012—sealing lip; 0013—spray head sealing ring; 0014—retainer; 0015—handle; 202—lower core; 103—steam nozzle; 206—steam pipe; 207—heating plate; 208—heating element; 209—heating element cover plate; 2010—counterbore; 2012—first sealing ring; 2013—folded edge; 2014—second sealing ring; 106—soft plug; 108—drain port; 109—plug; 1010—position-limiting block; 1011—sealing block; 1012—connecting rod; 1013—shift block; 1014—soft plug fixing hole; 1091—columnar main body; 1092—epitaxial force bearing portion; 1093—clamping groove; 1094—conical guiding surface; 1095—inner recess; 1061—connecting main body; 1062—sealing insertion post; 1063—second connecting post; 1064—tab.

DETAILED DESCRIPTION OF EMBODIMENTS

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in different configurations.

Therefore, the detailed description below of the embodiments of the present disclosure provided in the accompanying drawings is not intended to limit the scope of protection of the present disclosure, but merely represents chosen embodiments of the present disclosure. Based on the embodiments of the present disclosure, all of other embodiments obtained by those ordinarily skilled in the art without using any creative effort shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "upper", "lower", "inner", and "outer" are based on orientation or positional relationships as shown in the figures, or orientation or positional relationships of a product when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure. Besides, terms such as "first" and "second", if appear, are merely for distinctive description, but should not be construed as indicating or implying importance in the relativity.

Moreover, terms "horizontal", "vertical", and "overhanging" and the like do not mean that the parts are required to be absolutely horizontal or overhanging, but may be slightly inclined. For example, by "horizontal" it merely means that a structure is more horizontal in comparison with "vertical", rather than being completely horizontal, while the structure may be slightly inclined.

In the description of the present disclosure, it should be further illustrated that, unless otherwise specifically regulated and defined, the terms "provide", "mount", "link", and "connect" should be understood in a broad sense, for example, connection may be fixed connection, detachable connection, or integrated connection; it may be mechanical connection or electrical connection; it may be direct joining or indirect joining through an intermediary, and it also may be inner communication between two elements. For a person ordinarily skilled in the art, specific meanings of the above-mentioned terms in the present disclosure could be understood according to specific circumstances.

It should be noted that the features in the embodiments of the present disclosure may be combined with each other if there is no conflict.

In order to solve at least one of the above technical problems, the present disclosure provides a steam-type air fryer.

A technical solution of the present disclosure is as follows:

a steam-type air fryer, including:

an air outlet structure, wherein the air outlet structure includes a body shell, the body shell is provided therein with a cooking cavity, a steam generator in the body shell generates hot steam which is introduced into the cooking cavity, the cooking cavity is provided with an air outlet hole for discharging residual steam, a cold wind passage into which external cold air enters is formed between the cooking cavity and the body shell, wherein the body is provided with an air outlet hood, an air outlet hood seat is mounted at an inner side of the air outlet hood, a steam discharge passage connected to the air outlet hole is provided in the air outlet hood, a cold air passage in communication with the cold wind passage is formed between the air outlet hood and the air outlet hood seat, the cold air passage is arranged around the steam discharge passage, a steam outlet in communication with the steam discharge passage is provided in the middle of the air outlet hood, an air outlet in communication with the cold air passage is provided around the steam outlet, and the steam outlet is provided with a guiding component for guiding high-temperature steam discharged from the steam outlet to the air outlet.

In one or more embodiments, the air outlet hood includes a mask sealing up an opening in the body shell and a steam discharge pipe acting as the steam discharge passage provided in the middle of the mask, the steam discharge pipe is in communication with the air outlet hole, the steam discharge passage is inside the steam discharge pipe, and the mask is provided with an air outlet.

In one or more embodiments, the guiding component is a baffle plate, one side of the baffle plate is fixed at a front end of the steam outlet by a first connecting post, and the baffle plate guides and diffuses the hot steam discharged from the steam outlet to the position of the air outlet.

In one or more embodiments, an edge of the mask is provided with several position-limiting clamping plates extending radially, and the position-limiting clamping plates abut on an inner side of the opening in the body shell.

In one or more embodiments, the steam-type air fryer further includes a water inlet structure, wherein the water inlet structure includes an air fryer main body, an upper end of the air fryer main body is provided with a water tank seat, the water tank seat is detachably provided with a water tank, wherein the water tank is provided therein with a water outlet seat extending upward, the water tank seat is provided with a water outlet pipe corresponding to the water outlet seat, when the water tank is mounted on the water tank seat, the water outlet pipe is inserted into the water outlet seat, and the water outlet seat is provided therein with an hermetic water outlet passage communication the water outlet pipe and the bottom of the water tank.

In one or more embodiments, the water outlet seat extends upward from a bottom of the water tank to an upper part of the water tank, the hermetic water outlet passage in the water outlet seat is communicated with the bottom of the water tank through a water inlet at the bottom, and a water outlet of the hermetic water outlet passage is located at an upper part of the water outlet seat.

In one or more embodiments, a top portion of the water outlet seat is provided with a sealing cover integrally or detachably connected to the water outlet seat, and at least part of the hermetic water outlet passage is formed between the water outlet seat and the sealing cover.

In one or more embodiments, when the water tank is mounted on the water tank seat, the water outlet pipe is inserted into the water outlet seat, and an inlet of the water outlet pipe is located at a water outlet of the hermetic water outlet passage, and is hermetically connected by a sealing gasket.

In one or more embodiments, a steam inlet structure is further included, wherein the steam inlet structure includes an air fryer main body, the air fryer main body is provided therein with a cooking cavity, the cooking cavity is provided therein with a drawer-type frying basket, wherein the drawer-type frying basket is provided therein with a spray head, and a bottom of the air fryer main body is mounted with a steam inlet seat corresponding to the spray head, and the steam generated by a steam generator in the air fryer main body is introduced into the steam inlet seat and enters into the spray head through the steam inlet seat, to be sprayed into the drawer-type frying basket.

In one or more embodiments, an upper end of the steam inlet seat is mounted with a spray head sealing ring in contact with the bottom of the drawer-type frying basket.

In one or more embodiments, an upper end of the steam inlet seat is provided with a retainer in an annular shape, the spray head sealing ring covers the retainer and is fitted with the retainer in an inlaying manner, and an upper end of the spray head sealing ring is provided with a sealing lip in an annular shape at a position corresponding to the retainer, and the sealing lip is fitted with the bottom of the drawer-type frying basket in sealing.

In one or more embodiments, the diameter of the spray head sealing ring is larger than a steam inlet at the bottom of the spray head.

In one or more embodiments, the body is provided therein with a lower core, a cooking cavity is formed in the lower core, and the body is further provided therein with a heating element for heating a water flow entering the heating element to form hot steam which is introduced into the cooking cavity, wherein the cooking cavity is provided therein with a heating plate, and the heating plate and the heating element are in thermal conduction connection, to heat the steam condensate water in the cooking cavity to form steam.

In one or more embodiments, the heating plate is provided at the bottom of the cooking cavity.

In one or more embodiments, the bottom of the lower core is provided with a counterbore, and the heating plate is embedded in the counterbore.

In one or more embodiments, a lower end of the heating plate is closely provided with a heating element cover plate, and the heating element cover plate is mounted at an upper side of the heating element.

In one or more embodiments, the cooking cavity is provided therein with a drawer-type frying pot, the body is provided with a steam generator for forming hot steam that is introduced into the drawer-type frying pot, wherein a lower part of the drawer-type frying pot is provided with a drain port, for discharging steam condensate water in the drawer-type frying pot.

In one or more embodiments, the drain port is in a trepanning structure which is opened and closed by a hole sealing member.

In one or more embodiments, the hole sealing member is a plug, and the plug may be plugged into the drain port and pulled out from the drain port.

In one or more embodiments, the plug includes a columnar main body, an edge position of an upper end surface of the columnar main body is provided with a conical guide surface in an annular shape, a side wall of the columnar main body is provided with a clamping groove in an annular shape, configured to be snap-fitted with the drain port, one end of the columnar main body is provided with an epitaxial force bearing portion, and an inner recess in an annular shape is provided between the epitaxial force bearing portion and the columnar main body.

An air outlet structure of an air fryer having a steaming function, including a body shell, the body shell is provided therein with a cooking cavity, a steam generator in the body shell generates hot steam which is introduced into the cooking cavity, the cooking cavity is provided with an air outlet hole for discharging residual steam, a cold wind passage into which external cold air enters is formed between the cooking cavity and the body shell, wherein the body is provided with an air outlet hood, an air outlet hood seat is mounted at an inner side of the air outlet hood, a steam discharge passage connected to the air outlet hole is provided in the air outlet hood, a cold air passage in communication with the cold wind passage is formed between the air outlet hood and the air outlet hood seat, the cold air passage is arranged around the steam discharge passage, a steam outlet in communication with the steam discharge passage is provided in the middle of the air outlet hood, an air outlet in communication with the cold air passage is provided around the steam outlet, and the steam outlet is provided with a guiding component for guiding high-temperature steam discharged from the steam outlet to the air outlet.

In one or more embodiments, the air outlet hood includes a mask sealing up an opening in the body shell and a steam discharge pipe acting as the steam discharge passage provided in the middle of the mask, the steam discharge pipe is in communication with the air outlet hole, the steam discharge passage is inside the steam discharge pipe, and the mask is provided with an air outlet.

In one or more embodiments, the guiding component is a baffle plate, one side of the baffle plate is fixed at a front end of the steam outlet by a first connecting post, and the baffle plate guides and diffuses the hot steam discharged from the steam outlet to the position of the air outlet.

In one or more embodiments, an upper part of a rear side of the air outlet hood seat is provided with a cold air inlet.

In one or more embodiments, an edge of the mask is provided with several position-limiting clamping plates extending radially, and the position-limiting clamping plates abut on an inner side of the opening in the body shell.

In one or more embodiments, an inner side of the mask is provided with a snap-fit buckle, and the snap-fit buckle extends into the air outlet hood seat to be buckled with a clamping groove on a side wall of the air outlet hood seat.

In one or more embodiments, a lower portion outside the mask is provided with a protruding retainer, a bottom surface of the air outlet hood seat is an inclined surface, and the bottom surface is provided with a drain opening at the end.

In one or more embodiments, the side wall of the air outlet hood seat is provided with a mounting lug, and the air outlet hood seat is fixed in the body shell by the mounting lug.

In one or more embodiments, the air outlet is spirally arranged around a center of the mask.

In one or more embodiments, an upper end of the cooking cavity is provided with a cooling fan driven by a motor, and the cooling fan is located in the cold wind passage, to guide cold air in the cold wind passage into the cold air passage.

A steam-type air fryer with high thermal efficiency, including a body, the body is provided therein with a lower core, a cooking cavity is formed in the lower core, and the body is further provided therein with a heating element for heating a water flow entering the heating element to form hot steam which is introduced into the cooking cavity, wherein the cooking cavity is provided therein with a heating plate, and the heating plate and the heating element are in thermal conduction connection to each other, so as to heat the steam condensate water in the cooking cavity to form steam.

In one or more embodiments, the heating plate is provided at the bottom of the cooking cavity.

In one or more embodiments, the bottom of the lower core is provided with a counterbore, and the heating plate is embedded and mounted in the counterbore.

In one or more embodiments, a lower end of the heating plate is closely provided with a heating element cover plate, and the heating element cover plate is mounted at an upper side of the heating element.

In one or more embodiments, a bottom edge of the heating plate is provided with a folded edge horizontally extending outward, and a first sealing ring is mounted between an upper end portion of the folded edge and a side wall of the counterbore.

In one or more embodiments, an upper side of the heating element is provided with a sealing groove, and a second sealing ring embedded into the sealing groove is mounted between the heating element cover plate and the heating element.

In one or more embodiments, the hot steam generated by the heating element is sprayed into the cooking cavity through a steam nozzle on the side wall of the cooking cavity.

In one or more embodiments, the cooking cavity is provided therein with a drawer-type frying pot, and the steam nozzle passes through the lower core and a side wall of the drawer-type frying pot in sequence.

In one or more embodiments, the heating element has one end connected to the steam nozzle through the steam pipe, and the other end connected to the water tank on the body through the water pipe and the water pump.

In one or more embodiments, the heating plate and the heating element are both provided on a side of the bottom of the lower core close to the steam nozzle.

An air fryer ensuring food clean, including a body, wherein the body is provided therein with a cooking cavity, the cooking cavity is provided therein with a drawer-type frying pot, the body is provided with a steam generator for forming hot steam that is introduced into the drawer-type frying pot, wherein a lower part of the drawer-type frying pot is provided with a drain port, for discharging steam condensate water in the drawer-type frying pot.

In one or more embodiments, the drain port is in a trepanning structure which is opened and closed by a hole sealing member.

In one or more embodiments, the hole sealing member is a plug, and the plug may be plugged into the drain port and pulled out from the drain port.

In one or more embodiments, the plug includes a columnar main body, an edge position of an upper end surface of the columnar main body is provided with a conical guide surface in an annular shape, a side wall of the columnar main body is provided with a clamping groove in an annular shape, configured to be snap-fitted with the drain port, one end of the columnar main body is provided with an epitaxial force bearing portion, and an inner recess in an annular shape is provided between the epitaxial force bearing portion and the columnar main body.

In one or more embodiments, the hole sealing member is a translatable sealing block provided below the drain port, and the sealing block is embedded into a position-limiting block at the bottom of the drawer-type frying pot to translate, so as to close or open the drain port, and the position-limiting block is provided with a through hole that penetrates up and down, for the condensate water in the drain port to flow down.

In one or more embodiments, one side of the drawer-type frying pot is provided with a handle, the handle is provided with a shift block that can slide left and right, the shift block is connected to the sealing block through a connecting rod, and the sliding of the sealing block is controlled by the sliding of the shift block.

In one or more embodiments, the drain port is provided on a side wall of the lower part of the drawer-type frying pot, and the drain port is sealed by a soft plug.

In one or more embodiments, one side of the drain port is provided with a soft plug fixing hole, the soft plug includes a connecting main body, a second connecting post and a sealing insertion post, wherein the second connecting post and the sealing insertion post are arranged side by side at one side of the connecting main body, the second connecting post is inserted into the soft plug fixing hole, the sealing insertion post is inserted into the drain port, and one end of the connecting main body is provided with an extending tab.

In one or more embodiments, the side wall of the cooking cavity is mounted with a steam nozzle connected to the steam generator, and the steam nozzle passes through the cooking cavity and the side wall of the drawer-type frying pot.

In one or more embodiments, the bottom of the body is mounted with a detachable waste water box, and a bottom surface of the cooking cavity is inclined towards the position of the waste water box, so that the steam condensate water at the bottom of the cooking cavity flows into the waste water box through the sewage discharge opening.

A steam inlet structure of a steam-type air fryer, including an air fryer main body, the air fryer main body is provided therein with a cooking cavity, the cooking cavity is provided therein with a drawer-type frying basket, wherein the drawer-type frying basket is provided therein with a spray head, a bottom of the air fryer main body is mounted with a steam inlet seat corresponding to the spray head, the steam generated by a steam generator in the air fryer main body is introduced into the steam inlet seat and enters into the spray head through the steam inlet seat, to be sprayed into the drawer-type frying basket.

In one or more embodiments, an upper end of the steam inlet seat is mounted with a spray head sealing ring in contact with the bottom of the drawer-type frying basket.

In one or more embodiments, an upper end of the steam inlet seat is provided with a retainer in an annular shape, the spray head sealing ring covers the retainer and is fitted with the retainer in an inlaying manner, and an upper end of the spray head sealing ring is provided with a sealing lip in an annular shape at a position corresponding to the retainer, and the sealing lip is fitted with the bottom of the drawer-type frying basket in sealing.

In one or more embodiments, the diameter of the spray head sealing ring is larger than a steam inlet at the bottom of the spray head.

In one or more embodiments, the spray head sealing ring is mounted and fixed on the steam inlet seat by a pressing block thereon.

In one or more embodiments, one side of the steam inlet seat is provided with a steam inlet pipe, and the steam inlet pipe is communicated with the steam generator through a steam pipe.

In one or more embodiments, the bottom of the air fryer main body is provided with a mounting base, and a lower part of the steam inlet seat is connected to the mounting base by a compression spring.

In one or more embodiments, a lower part of the steam inlet seat is vertically provided with an insertion post, the compression spring is sheathed outside the insertion post, and the insertion post is inserted into a corresponding receptacle in the mounting base.

In one or more embodiments, the spray head is provided at a side of the bottom of the drawer-type frying basket away from a handle outside.

In one or more embodiments, the drawer-type frying basket is provided therein with a frying board, and the spray head is provided below the frying board and a direction of a steam injecting port of the spray head is provided facing the frying board.

A water inlet structure of a steam-type air fryer, including an air fryer main body, an upper end of the air fryer main body is provided with a water tank seat, the water tank seat is detachably provided with a water tank, wherein the water tank is provided therein with a water outlet seat extending upward, the water tank seat is provided with a water outlet pipe corresponding to the water outlet seat, when the water tank is mounted on the water tank seat, the water outlet pipe is inserted into the water outlet seat, and the water outlet seat is provided therein with an hermetic water outlet passage in communication with the water outlet pipe and the bottom of water tank.

In one or more embodiments, the water outlet seat extends upward from a bottom of the water tank to an upper part of the water tank, the hermetic water outlet passage in the water outlet seat is communicated with the bottom of the water tank through a water inlet at the bottom, and a water outlet of the hermetic water outlet passage is located at an upper part of the water outlet seat.

In one or more embodiments, a top portion of the water outlet seat is provided with a sealing cover integrally or detachably connected to the water outlet seat, and at least part of the hermetic water outlet passage is formed between the water outlet seat and the sealing cover.

In one or more embodiments, when the water tank is mounted on the water tank seat, the water outlet pipe is inserted into the water outlet seat, and an inlet of the water outlet pipe is located at a water outlet of the hermetic water outlet passage, and is hermetically connected by a sealing gasket.

In one or more embodiments, a side wall of a lower side of the water outlet seat is provided with a conical side wall corresponding to a receptacle, for guiding and inserting the water outlet pipe into the receptacle.

In one or more embodiments, a position-limiting plate is provided below the sealing cover, for being inserted into the sealing gasket to limit the position of the sealing gasket. The sealing gasket includes a cylindrical main body, an outer side of the cylindrical main body is provided with a sealing protrusion, one end of the cylindrical main body is provided with an insertion slot for the position-limiting plate to be inserted therein, and the sealing protrusion hermetically fits with the water outlet pipe.

In one or more embodiments, an upper end of the water tank is detachably mounted with a cover plate, and the cover plate and the water tank are hermetically snap-fitted.

In one or more embodiments, a water adding cover is detachably mounted on the cover plate, and the water adding cover and the cover plate are hermetically snap-fitted.

In one or more embodiments, the water tank seat is provided with a convex peripheral rim matched with the shape of a lower part of the water tank, and the lower part of the water tank is fitted and embedded into the convex peripheral rim.

In one or more embodiments, a lower end of the water outlet pipe is provided with a water pipe joint.

The present disclosure provides an air outlet structure of an air fryer having a steaming function, which may reduce the temperature of steam discharged, and may guide condensate water into a cooking cavity.

In order to achieve the above objective, the present disclosure provides a technical solution as follows: an air outlet structure of an air fryer having a steaming function, including a body shell, the body shell is provided therein with a cooking cavity, a steam generator in the body shell generates hot steam which is introduced into the cooking cavity, the cooking cavity is provided with an air outlet hole for discharging residual steam, a cold wind passage into which external cold air enters is formed between the cooking cavity and the body shell, wherein the body is provided with an air outlet hood, an air outlet hood seat is mounted at an inner side of the air outlet hood, a steam discharge passage connected to the air outlet hole is provided in the air outlet hood, a cold air passage in communication with the cold wind passage is formed between the air outlet hood and the air outlet hood seat, the cold air passage is arranged around the steam discharge passage, a steam outlet in communication with the steam discharge passage is provided in the middle of the air outlet hood, an air outlet in communication with the cold air passage is provided around the steam outlet, and the steam outlet is provided with a guiding component for guiding high-temperature steam discharged from the steam outlet to the air outlet.

In one or more embodiments, the air outlet hood includes a mask sealing up an opening in the body shell and a steam discharge pipe provided in the middle of the mask, the steam discharge pipe is in communication with the air outlet hole through the air outlet hood seat, the steam discharge passage is inside the steam discharge pipe, and the mask is provided with an air outlet.

In one or more embodiments, the guiding component is a baffle plate, one side of the baffle plate is fixed at a front end of the steam outlet by a first connecting post, and the baffle plate guides and diffuses the hot steam discharged from the steam outlet to the position of the air outlet.

In one or more embodiments, an upper part of a rear side of the air outlet hood seat is provided with a cold air inlet.

In one or more embodiments, an edge of the mask is provided with several position-limiting clamping plates extending radially, and the position-limiting clamping plates abut on an inner side of the opening in the body shell.

In one or more embodiments, an inner side of the mask is provided with a snap-fit buckle, and the snap-fit buckle extends into the air outlet hood seat to be buckled with a clamping groove on a side wall of the air outlet hood seat.

In one or more embodiments, a lower portion outside the mask is provided with a protruding retainer, a bottom surface of the air outlet hood seat is an inclined surface, and the bottom surface is provided with a drain opening at the end.

In one or more embodiments, the side wall of the air outlet hood seat is provided with a mounting lug, and the air outlet hood seat is fixed in the body shell by the mounting lug.

In one or more embodiments, the air outlet is spirally arranged around a center of the mask.

In one or more embodiments, an upper end of the cooking cavity is provided with a cooling fan driven by a motor, and the cooling fan is located in the cold wind passage to guide cold air in the cold wind passage into the cold air passage.

Compared with the prior art, the beneficial effects of the air outlet structure of the steam-type air fryer in the present disclosure are as follows:

1. the steam passage and the air cooling passage are formed between the air outlet hood and the air outlet hood seat, the cold air may cool the steam discharge passage while the cold wind is discharged from the air outlet of an air guide cover, as the cold air cools the steam in the steam discharge passage, the temperature of the exhaust gas is reduced to prevent the user from being burnt by too high temperature;

2. the guiding component is provided, which may guide the high-temperature steam from the steam outlet to the position of the air outlet, and may be smoothly mixed with cold air discharged from the air outlet;

3. the condensate water formed by condensation of water steam at the air outlet of the air guide cover may be blocked by the protruding retainer at the lower part of the air guide cover, and flows back into the steam-type air fryer, and finally is guided to the bottom of the cooking cavity to flow into the waste water collecting box, so as to avoid the condensate water from flowing onto the worktop; and 4. the air outlet on the air outlet hood has a spiral shape, which may achieve a better cooling effect, and after flowing out of the air outlet hood, the steam and the cold air may be mixed to rapidly reduce the steam temperature, without affecting the discharge of the steam.

The present disclosure further provides a water inlet structure of a steam-type air fryer, which has a simple structure, avoids the risk of water leakage of the water tank, and is convenient to use.

In order to achieve the above objective, the present disclosure provides a technical solution as follows: a water inlet structure of a steam-type air fryer, including an air fryer main body, an upper end of the air fryer main body is provided with a water tank seat, the water tank seat is detachably provided with a water tank, the water tank is provided therein with a water outlet seat extending upward, the water tank seat is provided with a water outlet pipe corresponding to the water outlet seat, when the water tank is mounted on the water tank seat, the water outlet pipe is inserted into the water outlet seat, and the water outlet seat is provided therein with an hermetic water outlet passage in communication with the water outlet pipe and the bottom of the water tank.

In one or more embodiments, the water outlet seat extends upward from a bottom of the water tank to an upper part of the water tank, the hermetic water outlet passage in the water outlet seat is communicated with the bottom of the water tank through a water inlet at the bottom, and a water outlet of the hermetic water outlet passage is located at an upper part of the water outlet seat.

In one or more embodiments, a top portion of the water outlet seat is provided with a sealing cover integrally or detachably connected to the water outlet seat, and at least part of the hermetic water outlet passage is formed between the water outlet seat and the sealing cover.

In one or more embodiments, when the water tank is mounted on the water tank seat, the water outlet pipe is inserted into the water outlet seat, and an inlet of the water outlet pipe is located at a water outlet of the hermetic water outlet passage, and is hermetically connected by a sealing gasket.

In one or more embodiments, a side wall of a lower side of the water outlet seat is provided with a conical side wall corresponding to a receptacle, for guiding and inserting the water outlet pipe into the receptacle.

In one or more embodiments, a position-limiting plate is provided below the sealing cover, for being inserted into the sealing gasket to limit the position of the sealing gasket. The sealing gasket includes a cylindrical main body, an outer side of the cylindrical main body is provided with a sealing protrusion, one end of the cylindrical main body is provided with an insertion slot for the position-limiting plate to be inserted therein, and the sealing protrusion hermetically fits with the water outlet pipe.

In one or more embodiments, an upper end of the water tank is detachably mounted with a cover plate, and the cover plate and the water tank are hermetically snap-fitted.

In one or more embodiments, a water adding cover is detachably mounted on the cover plate, and the water adding cover and the cover plate are hermetically snap-fitted.

In one or more embodiments, the water tank seat is provided with a convex peripheral rim matched with the shape of a lower part of the water tank, and the lower part of the water tank is fitted and embedded into the convex peripheral rim.

In one or more embodiments, a lower end of the water outlet pipe is provided with a water pipe joint.

Compared with the prior art, the beneficial effects of the water inlet structure of the steam-type air fryer in the present disclosure are as follows:

the water outlet seat extending upward is provided in the water tank, and is inserted and fitted with the water outlet pipe on the water tank seat to form the hermetic water outlet passage, which may ensure that when the water tank is removed from the water tank seat, even if there is water in the water tank, the water will not flow out through the water tank seat outlet due to gravity, thus ensuring the practicability of the product; the cover plate is detachably sealed and clamped on the water tank, and may be monolithically removed to facilitate cleaning the water tank; the water adding cover is detachably sealed and clamped on the cover plate to facilitate adding water to the water tank.

The present disclosure further provides a steam inlet structure of a steam-type air fryer, which has a simple structure, and may directly introduce steam into a drawer-type frying basket to directly heat and cook food.

In order to achieve the above objective, the present disclosure provides a technical solution as follows: a steam inlet structure of a steam-type air fryer, including an air fryer main body, the air fryer main body is provided therein with a cooking cavity, the cooking cavity is provided therein with a drawer-type frying basket, the drawer-type frying basket is provided therein with a spray head, and a bottom of the air fryer main body is mounted with a steam inlet seat corresponding to the spray head, and the steam generated by a steam generator in the air fryer main body is introduced into the steam inlet seat and enters into the spray head through the steam inlet seat to be sprayed into the drawer-type frying basket.

In one or more embodiments, an upper end of the steam inlet seat is mounted with a spray head sealing ring contacting the bottom of the drawer-type frying basket.

In one or more embodiments, the diameter of the spray head sealing ring is larger than a steam inlet at the bottom of the spray head.

In one or more embodiments, the spray head sealing ring is mounted and fixed on the steam inlet seat by a pressing block above.

In one or more embodiments, one side of the steam inlet seat is provided with a steam inlet pipe, and the steam inlet pipe is communicated with the steam generator through a steam pipe.

In one or more embodiments, the bottom of the air fryer main body is provided with a mounting base, and a lower part of the steam inlet seat is connected to the mounting base by a compression spring.

In one or more embodiments, a lower part of the steam inlet seat is vertically provided with an insertion post, the compression spring is sheathed outside the insertion post, and the insertion post is inserted into a corresponding receptacle in the mounting base.

In one or more embodiments, the spray head is provided at a side of the bottom of the drawer-type frying basket away from a handle outside.

In one or more embodiments, the drawer-type frying basket is provided therein with a frying board, and the spray head is provided below the frying board and a direction of a steam injecting port of the spray head is provided facing the frying board.

In one or more embodiments, an upper end of the steam inlet seat is provided with a retainer being in an annular shape, the spray head sealing ring covers the retainer and is fitted with the retainer in an inlaying manner, and an upper end of the spray head sealing ring is provided with a sealing lip being in an annular shape at a position corresponding to the retainer.

Compared with the prior art, the beneficial effects of the steam inlet structure of the steam-type air fryer in the present disclosure are as follows:

1. the steam generated by the steam generator in the steam-type air fryer enters the steam inlet seat via the steam inlet pipe, the steam in the steam inlet seat flows through an internal channel to the spray head of the frying basket, and the steam is sprayed into the frying basket via the spray head to achieve steam cooking;

2. the spray head sealing ring is provided on the steam inlet seat to ensure that the steam completely flows into the spray head; meanwhile, the diameter of the spray head sealing ring is larger than the steam inlet of the spray head, thus ensuring that the flow of steam is not affected even if the position of frying basket is not quite proper;

3. the bottom of the steam inlet seat is provided with the compression spring, so that the steam inlet seat has an upward tension, thereby ensuring that the sealing lip of the spray head sealing ring can be pressed against the bottom of the frying basket to achieve sealing; and 4. the frying basket is provided therein with the frying board, the spray head is located below the frying board, the steam injecting port of the spray head is provided close to the frying board, and the steam may enter the upper part of the frying basket through the opening in the frying board to cook food.

The present disclosure further provides a steam-type air fryer with high thermal efficiency, which may evaporate the condensate water in the cooking cavity twice, thus improving the utilization rate of heat of the steam generator.

In order to achieve the above objective, the present disclosure provides a following technical solution: a steam-type air fryer with high thermal efficiency, including a body, the body is provided therein with a lower core, a cooking cavity is formed in the lower core, and the body is further provided therein with a heating element for heating a water flow entering the heating element to form hot steam which is introduced into the cooking cavity, the cooking cavity is provided therein with a heating plate, and the heating plate and the heating element are in thermal conduction connection to heat the steam condensate water in the cooking cavity to form steam.

In one or more embodiments, the heating plate is provided at the bottom of the cooking cavity.

In one or more embodiments, the bottom of the lower core is provided with a counterbore, and the heating plate is embedded and mounted in the counterbore.

In one or more embodiments, a lower end of the heating plate is closely provided with a heating element cover plate, and the heating element cover plate is mounted at an upper side of the heating element.

In one or more embodiments, a bottom edge of the heating plate is provided with a folded edge horizontally extending outward, and a first sealing ring is mounted between an upper end portion of the folded edge and a side wall of the counterbore.

In one or more embodiments, an upper side of the heating element is provided with a sealing groove, and a second sealing ring embedded into the sealing groove is mounted between the heating element cover plate and the heating element.

In one or more embodiments, the hot steam generated by the heating element is sprayed into the cooking cavity through a steam nozzle on the side wall of the cooking cavity.

In one or more embodiments, the cooking cavity is provided therein with a drawer-type frying pot, and the steam nozzle passes through the lower core and a side wall of the drawer-type frying pot in sequence.

In one or more embodiments, the heating element has one end connected to the steam nozzle through the steam pipe, and the other end connected to the water tank on the body through the water pipe and the water pump.

In one or more embodiments, the heating plate and the heating element are both provided on a side of the bottom of the lower core close to the steam nozzle.

Compared with the prior art, the beneficial effects of the steam-type air fryer with high thermal efficiency in the present disclosure are as follows:

1. the heating plate is provided in the cooking cavity, and the steam condensate water may be heated again through heat dissipation of the heating element (steam generator), so as to form steam in a second time, thereby improving the utilization rate of heat;

2. the heating plate is embedded into the concave counterbore at the bottom, thus the steam condensate water may be better collected and heated; and 3. the hermetic fit and connection between the heating element, the heating element cover plate, and the heating plate prevent water leakage.

The present disclosure further provides an air fryer ensuring food clean, wherein a drain port is provided at the bottom of a drawer-type frying pot, then condensate water in the pot may be discharged, thereby preventing the food from being contaminated by the condensate water In order to achieve the above objective, the present disclosure provides a technical solution as follows: an air fryer ensuring food clean, including a body, wherein the body is provided therein with a cooking cavity, the cooking cavity is provided therein with a drawer-type frying pot, the body is provided with a steam generator for forming hot steam that is introduced into the drawer-type frying pot, and a lower part of the drawer-type frying pot is provided with a drain port, for discharging steam condensate water in the drawer-type frying pot.

In one or more embodiments, the drain port is in a trepanning structure which is opened and closed by a hole sealing member.

In one or more embodiments, the hole sealing member is a plug, and the plug may be plugged into the drain port and pulled out from the drain port.

In one or more embodiments, the plug includes a columnar main body, an edge position of an upper end surface of the columnar main body is provided with a conical guide surface being in an annular shape, a side wall of the columnar main body is provided with a clamping groove being in an annular shape, configured to be snap-fitted with the drain port, one end of the columnar main body is provided with an epitaxial force bearing portion, and an inner recess being in an annular shape is provided between the epitaxial force bearing portion and the columnar main body.

In one or more embodiments, the hole sealing member is a translatable sealing block provided below the drain port, and the sealing block is embedded into a position-limiting block at the bottom of the drawer-type frying pot to translate so as to close or open the drain port, and the position-limiting block is provided with a through hole that penetrates up and down, for the condensate water in the drain port to flow down.

In one or more embodiments, one side of the drawer-type frying pot is provided with a handle, the handle is provided with a shift block that can slide left and right, the shift block is connected to the sealing block through a connecting rod, and the sliding of the sealing block is controlled by the sliding of the shift block.

In one or more embodiments, the drain port is provided on a side wall of the lower part of the drawer-type frying pot, and the drain port is sealed by a soft plug.

In one or more embodiments, one side of the drain port is provided with a soft plug fixing hole, the soft plug includes a connecting main body, a second connecting post and a sealing insertion post, wherein the second connecting post and the sealing insertion post are arranged side by side at one side of the connecting main body, the second connecting post is inserted into the soft plug fixing hole, the sealing insertion post is inserted into the drain port, and one end of the connecting main body is provided with an extending tab.

In one or more embodiments, the bottom of the body is mounted with a detachable waste water box, and a bottom surface of the cooking cavity is inclined towards the position of the waste water box, so that the steam condensate water at the bottom of the cooking cavity flows into the waste water box through the sewage discharge opening.

In one or more embodiments, the drawer-type frying pot is internally erected with a frying board for placing food, and the steam nozzle is provided at a position above the frying board.

Compared with the prior art, the beneficial effects of the air fryer ensuring food clean in the present disclosure are as follows:

1. for the air fryer having a steam function, the drain port is provided at the bottom of the inner drawer-type frying pot, then condensate water in the pot may be discharged, thereby preventing the food from being contaminated by the condensate water;

2. the hole sealing member is provided at the drain port at the bottom of the drawer-type frying pot, and before the food is taken out, the drain port may be opened to discharge condensate water in time; and 3. the steam condensate water may flow along the bottom of the cooking cavity to the sewage discharge opening and be discharged into the waste water box.

The embodiments of the present disclosure are further described in detail below with reference to the accompanying drawings.

As shown in FIGS. 1-6, the present disclosure provides a water outlet structure of an air fryer having a steaming function, including a body shell 1, the body shell 1 is provided therein with a cooking cavity 4, a steam generator in the body shell 1 generates hot steam which is introduced into the cooking cavity 4, the cooking cavity 4 is provided with an air outlet hole 18 for discharging residual steam, a cold wind passage 17 into which external cold air enters is formed between the cooking cavity 4 and the body shell 1, wherein the body 1 is provided with an air outlet hood 3, an air outlet hood seat 2 is mounted at an inner side of the air outlet hood 3, a steam discharge passage connected to the air outlet hole 18 is provided in the air outlet hood 3, a cold air passage in communication with the cold wind passage 17 is formed between the air outlet hood 3 and the air outlet hood seat 2, the cold air passage is arranged around the steam discharge passage, a steam outlet in communication with the steam discharge passage is provided in the middle of the air outlet hood 3, an air outlet 5 in communication with the cold air passage is provided around the steam outlet, and the steam outlet is provided with a guiding component for guiding high-temperature steam discharged from the steam outlet to the air outlet 5.

In the present disclosure, the cold wind passage 17 is a structure originally existing in the air fryer, which can suck external cold air into the air fryer, so as to quickly take away heat generated by the cooking cavity and electric components. The cold air will enter through the cold air passage in the air outlet hood 3 and is discharged to the outside of the air fryer, and the high-temperature steam in the steam discharge passage is also discharged to the outside of the air fryer at a similar position. The hot steam and the cold air may be mixed quickly, so as to reduce the temperature of the steam.

In a solution of the present disclosure, a guiding component is provided at the steam outlet, which may guide the high-temperature steam from the steam outlet to the position of the air outlet, and may be successfully mixed with the cold air discharged from the air outlet.

Embodiment 1

The air outlet hood 3 includes a mask 12 sealing up an opening in the body shell 1 and a steam discharge pipe 8 provided in the middle of the mask 12, the steam discharge pipe 8 passes through the air outlet hood seat 2 and is in communication with the air outlet hole 18, the steam discharge passage is inside the steam discharge pipe 8, and the mask 12 is provided with the air outlet 5, wherein the air outlet 5 is spirally arranged around the center of the mask 12, thus cold air will be discharged from the air outlet 5 spirally arranged, to enclose hot steam discharged from the steam discharge pipe 8, thereby realizing rapid cooling of the hot steam.

In order to facilitate the cold air in the cold wind passage 17 to enter the air outlet hood seat 2, an upper part of a rear side of the air outlet hood seat 2 is provided with a cold air inlet 9, and the cold air inlet 9 has a cross section in a horn shape, in this way, the speed of air flow entering the cold air inlet 9 may be increased.

In order to facilitate the installation of the air outlet hood 3, an edge of the mask 12 is provided with several position-limiting clamping plates 6 radially extending, and the position-limiting clamping plates 6 abut on an inner side of the opening in the body shell 1, which can prevent the mask 12 from falling off from the body shell 1.

Furthermore, an inner side of the mask 12 is provided with a snap-fit buckle 7, and the snap-fit buckle 7 extends into the air outlet hood seat 2 to be buckled with a clamping groove 10 on a side wall of the air outlet hood seat 2, thus realizing quick connection between the air outlet hood 3 and the air outlet hood seat 2.

Embodiment 2

The guiding component is a baffle plate 19, one side of the baffle plate 19 is fixed at a front end of the steam outlet by a first connecting post 22, and the baffle plate 19 guides and diffuses the hot steam discharged from the steam outlet to the position of the air outlet 5. The baffle plate 19 is in a circular or oval shape, so that the guiding is more uniform.

Embodiment 3

As mentioned above, as the hot steam coming out from the air outlet hood 3 is rapidly mixed with the cold air, the temperature of the hot steam is reduced, and a lot of condensate water will be generated, a protruding retainer 14 is provided in a lower portion outside the mask 12, wherein the protruding retainer 14 is in an arc shape, and is shaped with a high outer end and a lower inner end. A bottom surface of the air outlet hood seat 2 is an inclined surface, and the bottom surface is provided with a drain opening 13 at the end. The condensate water falls on the protruding retainer 14, flows into the drain opening 13 along a bottom surface of the air outlet hood seat 2, and flows along the interior of a lower core to the bottom of the cooking cavity or directly into a waste water box, preventing the condensate water from flowing onto the worktop outside.

In order to facilitate the installation and fixation of the air outlet hood seat 2, a side wall of the air outlet hood seat 2 is provided with a mounting lug 11, and the air outlet hood seat 2 is fixed in the body shell 1 by the mounting lug 11.

An upper part of the cooking cavity 4 is an air duct plate 15, and the air outlet hole 18 is provided in a side wall of the air duct plate 15, meanwhile, an upper end of the cooking cavity 4 is provided with a cooling fan 16 driven by a motor, and the cooling fan 16 may accelerate air flow in the cold wind passage 17.

As shown in FIGS. 7-12, the present disclosure provides a water inlet structure of a steam-type air fryer, including an air fryer main body 1, an upper end of the air fryer main body 1 is provided with a water tank seat 010, the water tank seat 010 is detachably provided with a water tank 04, the water tank 04 is provided therein with a water outlet seat 08 extending upward, the water tank seat 010 is provided with a water outlet pipe 09 corresponding to the water outlet seat 08, when the water tank 04 is mounted on the water tank seat 010, the water outlet pipe 09 is inserted into the water outlet seat 08, and the water outlet seat 08 is provided therein with an hermetic water outlet passage 011 in communication with the water outlet pipe 09 and the water tank 04.

The water outlet seat 08 extends upward from a bottom of the water tank 04 to an upper part of the water tank 04, the hermetic water outlet passage 011 in the water outlet seat 08 is communicated with the bottom of the water tank 04 through a water inlet 015 at the bottom, and a water outlet of the hermetic water outlet passage 011 is located at the upper part of the water outlet seat 08.

The water outlet pipe 09 is connected to a water pump, and when the water pump is in operation, water in the water tank 04 may be withdrawn through the water outlet pipe 09 and the hermetic water outlet passage 011, and is introduced into the steam generator inside the air fryer.

When the water surface in the water tank 04 is lower than the water outlet seat 08, the water in the water tank 04 cannot be removed from the water outlet seat 08 without suction, thus the water tank 04 will not leak water when lifted, wherein the water outlet seat 08 may extend upward to the upper part of the water tank 04, in this way the water leakage will not occur even if the water surface in the water tank 04 is relatively high.

A top portion of the water outlet seat is provided with a sealing cover integrally or detachably connected to the water outlet seat, at least a part of the hermetic water outlet passage 011 is formed between the water outlet seat 08 and the sealing cover 06, and the sealing cover 06 functions to seal the upper end of the water outlet seat 08, thus preventing water from entering from the upper end of the water outlet seat 08. For convenience of cleaning, the sealing cover 06 may be provided with a detachable structure.

In the above, when the water tank 04 is mounted on the water tank seat 010, the water outlet pipe 09 is inserted into the water outlet seat 08, and an inlet of the water outlet pipe 09 is located at a water outlet of the hermetic water outlet passage 011, and is hermetically connected by a sealing gasket 07. A side wall of a lower side of the water outlet seat 08 is provided with a conical side wall 013 corresponding to a receptacle, for guiding the water outlet pipe 09 to be inserted into the receptacle.

In order to support the sealing gasket 07, a position-limiting plate 061 is provided below the sealing cover 06, for being inserted into the sealing gasket 07 to limit the position of the sealing gasket 07. The sealing gasket 07 includes a cylindrical main body 072, an outer side of the cylindrical main body 072 is provided with a sealing protrusion 073, one end of the cylindrical main body 072 is provided with an insertion slot 071 for the position-limiting plate 061 to be inserted therein, the sealing protrusion 073 is hermetically fitted with the water outlet pipe 09, and the position-limiting plate 061 may support the sealing gasket 07, so that the sealing gasket 07 cannot be deformed to a great extent, then the sealing stability can be improved. The position-limiting plate 061 is provided with a notch on a side facing the hermetic water outlet passage 011, so that water in the hermetic water outlet passage 011 may smoothly enter the water outlet pipe 09.

In order to facilitate cleaning the interior of the water tank 04, the upper end of the water tank 04 is detachably mounted with a cover plate 03, and the cover plate 03 and the water tank 04 are hermetically snap-fitted.

In order to conveniently add water into the water tank 04, a water adding cover 05 is detachably mounted on the cover plate 03, and the water adding cover 05 and the cover plate 03 are hermetically snap-fitted.

The water tank seat 010 is provided with a convex peripheral rim 016 matching the shape of a lower part of the water tank 04, and the lower part of the water tank 04 is fitted and embedded into the convex peripheral rim 016, so that the water tank seat 010 and the water tank 04 are well fitted, then the water outlet pipe 09 can be smoothly inserted into the water outlet seat 08. The lower end of the water outlet pipe 09 is provided with a water pipe joint 012, facilitating the connection with the water pipe.

As shown in FIGS. 13-17, the present disclosure provides a steam inlet structure of a steam-type air fryer, including an air fryer main body 1, the air fryer main body 1 is provided therein with a cooking cavity 4; the cooking cavity 4 is provided therein with a drawer-type frying basket 002, the drawer-type frying basket 002 is provided therein with a spray head 005, and a bottom of the air fryer main body 1 is mounted with a steam inlet seat 007 corresponding to the spray head 005. The steam generated by a steam generator in the air fryer main body 1 is introduced into the steam inlet seat 007 and enters into the spray head 005 through the steam inlet seat 007 to be sprayed into the drawer-type frying basket 002.

When used, the steam generator heats water to form hot steam, which is introduced into the steam inlet seat 007 and enters the spray head 005. The high-temperature steam is directly sprayed into the drawer-type frying basket 002 through the spray head 005, and the steam inlet seat 007 is in contact, rather than in connection, with the drawer-type frying basket 002, thus the steam inlet seat 007 will not move when the drawer-type frying basket 002 is withdrawn from the cooking cavity 4, while the spray head 005 will be butted and communicated with the steam inlet seat 007 by itself when the drawer-type frying basket 002 is inserted into the cooking cavity 4.

In order to improve the sealability of steam transmission, an upper end of the steam inlet seat 007 is mounted with a spray head sealing ring 0013 contacting the bottom of the drawer-type frying basket 002, the spray head sealing ring 0013 realizes sealing between the steam inlet seat 007 and a bottom wall of the drawer-type frying basket 002, ensuring that steam entering the steam inlet seat 007 can enter the spray head 005. The diameter of the spray head sealing ring 0013 is larger than a steam inlet at the bottom of the spray head 005, ensuring that the flow of steam is still not affected even if the position of the frying basket is not quite proper.

As a mounting manner of the spray head sealing ring 0013, the spray head sealing ring 0013 is mounted and fixed on the steam inlet seat 007 by a pressing block 008 thereon, and the pressing block 008 is in surface contact with the spray head sealing ring 0013, then the sealability of compression can be ensured.

In the above, an upper end of the steam inlet seat 007 is provided with a retainer 0014 in an annular shape, the spray head sealing ring 0013 covers the retainer 0014 and is fitted with the retainer 0014 in an inlaying manner, an upper end of the spray head sealing ring 0013 is provided with a sealing lip 0012 in an annular shape at a position corresponding to the retainer 0014, and the sealing lip 0012 and the retainer 0014 are in the same vertical direction, then the retainer 0014 improves the support degree of the spray head sealing ring 0013, reduces the deformation, and thus improves the sealing effect.

In order to facilitate connecting the steam inlet seat 007 with the steam generator, one side of the steam inlet seat 007 is provided with a steam inlet pipe 009, and the steam inlet pipe 009 is communicated with the steam generator through a steam pipe.

In order to support and limit the position of the steam inlet seat 007, the bottom of the air fryer main body 1 is provided with a mounting base 003, and a lower part of the steam inlet seat 007 is connected to the mounting base 003 by a compression spring 0010, so that the steam inlet seat 007 has an upward tension, thus ensuring that the sealing lip of the spray head sealing ring 0013 can be pressed against the bottom of the frying basket to achieve sealing, meanwhile, the lower part of the steam inlet seat 007 is vertically provided with an insertion post 0011, the compression spring 0010 is sheathed outside the insertion post 0011, and the insertion post 0011 is inserted into a corresponding receptacle in the mounting base 003, thus, the steam inlet seat 007 can only move vertically but cannot move horizontally.

In order to make the structure more reasonable, the spray head 005 is provided at a side of the bottom of the drawer-type frying basket 002 away from a handle 0015 outside, and meanwhile, the drawer-type frying basket 002 is provided therein with a frying board 006, the spray head 005 is provided below the frying board 006 and a direction of a steam injecting port of the spray head 005 is provided facing the frying board 006, then the steam may enter the upper part of the drawer-type frying basket 002 through an opening in the frying board 006 to cook food.

Figure 18:
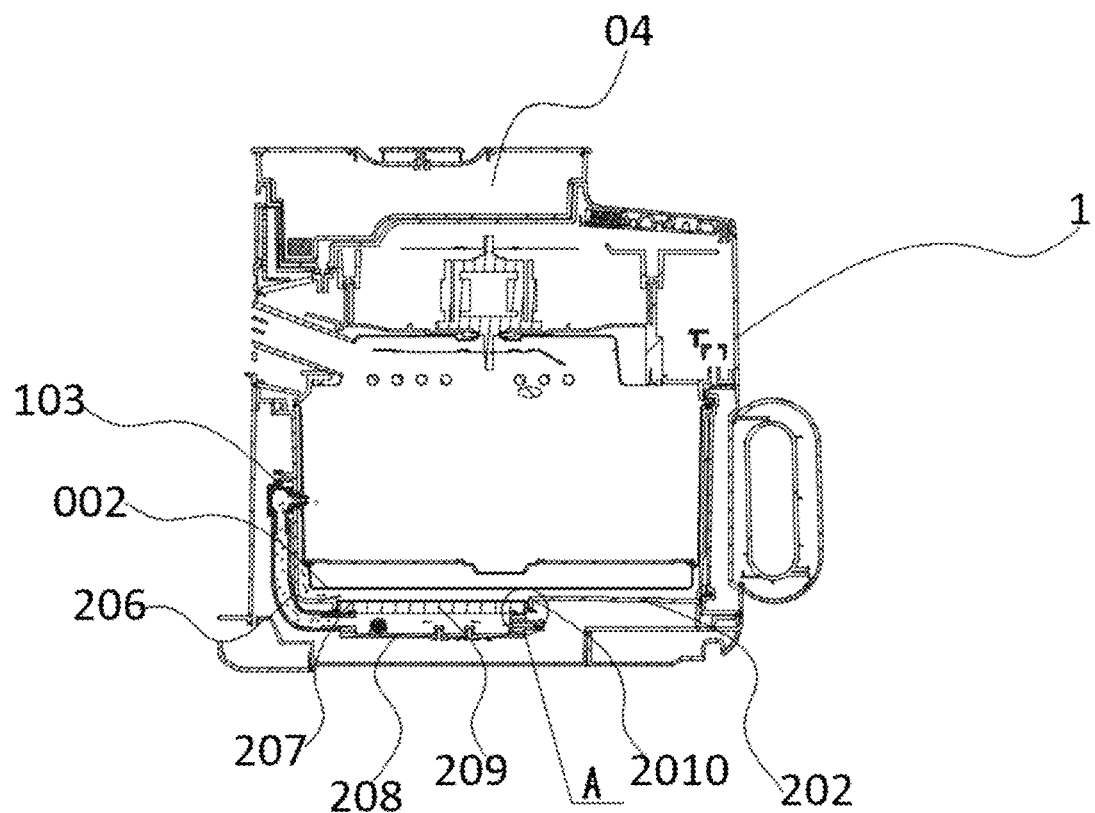
FIG. 18 is a front semi-sectional structural view of the steam-type air fryer in the present disclosure.
Figure 19:
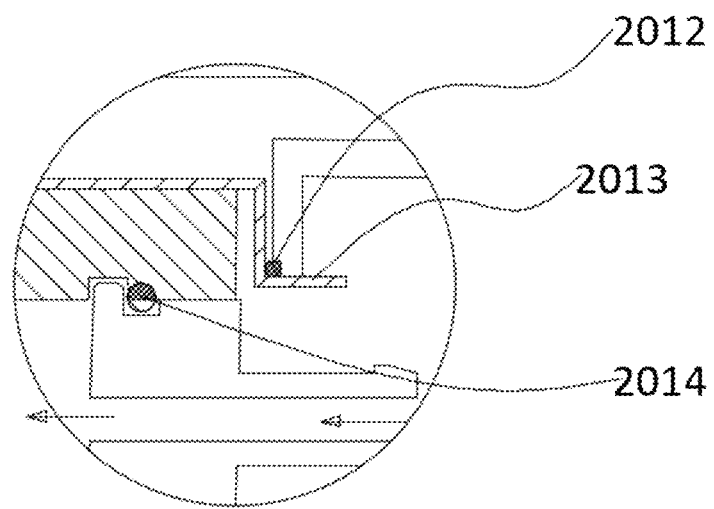
FIG. 19 is an enlarged structural view of a part A in FIG. 18.
Figure 20:
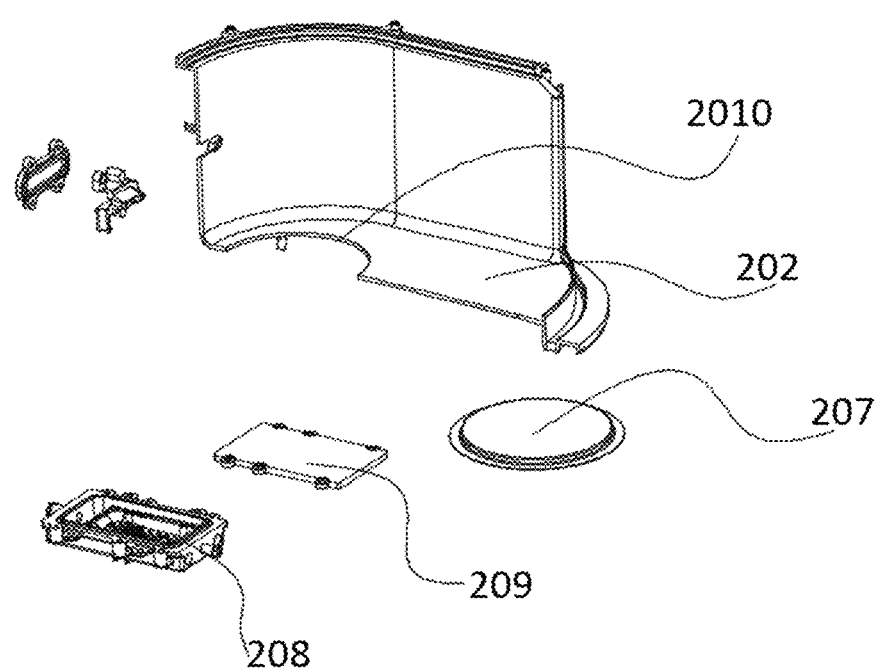
FIG. 20 is an exploded structural view of a lower core of the steam-type air fryer in the present disclosure.
Figure 21:
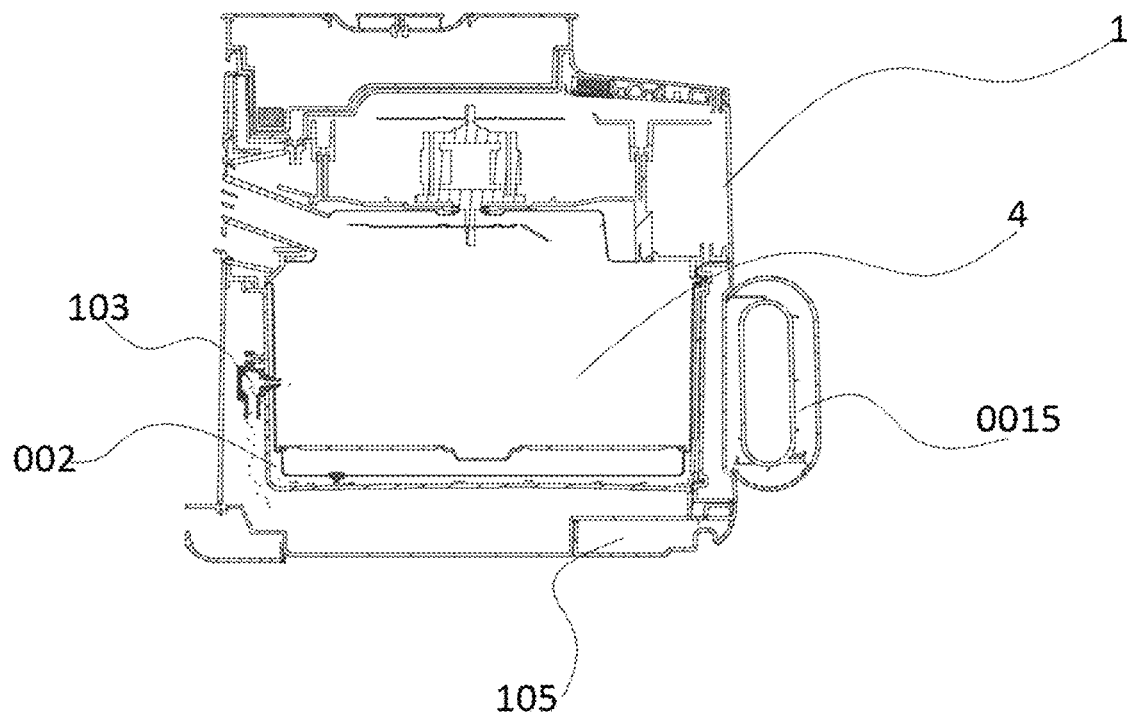
FIG. 21 is a front semi-sectional structural view of the steam-type air fryer in the present disclosure.
Figure 22:
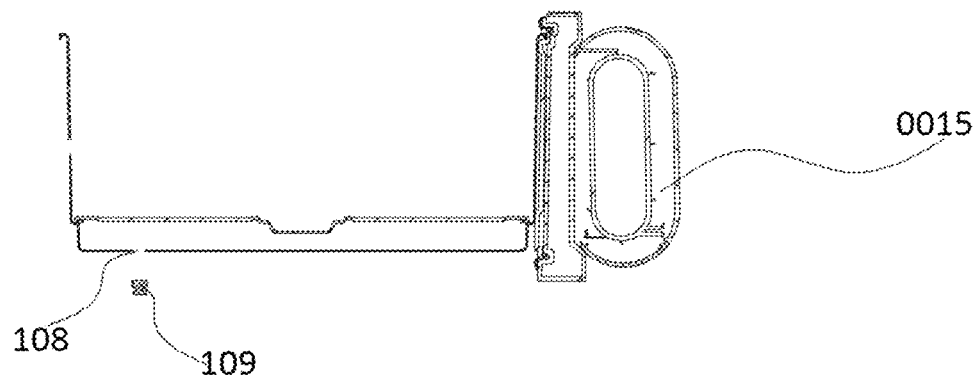
FIG. 22 is a partial semi-sectional structural view of a structure of the steam-type air fryer in the present disclosure.
Figure 23:
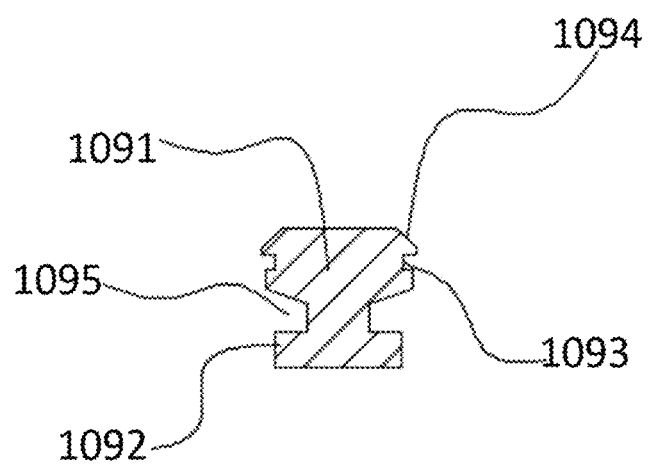
FIG. 23 is a semi-sectional structural view of a plug of the steam-type air fryer in the present disclosure.
Figure 24:
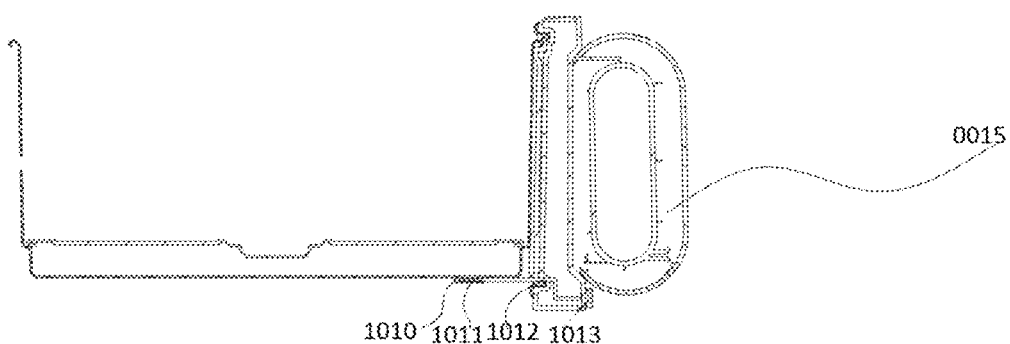
FIG. 24 is a partial semi-sectional structural view of another structure of the steam-type air fryer in the present disclosure.
Figure 25:
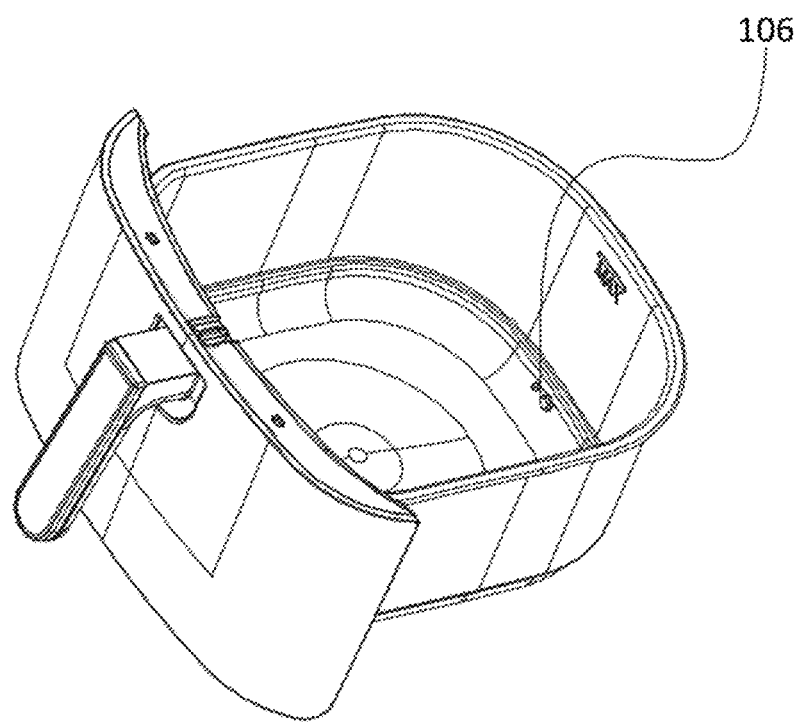
FIG. 25 is a perspective structural view of a drawer-type frying pot of a third structure of the steam-type air fryer in the present disclosure.
Figure 26:
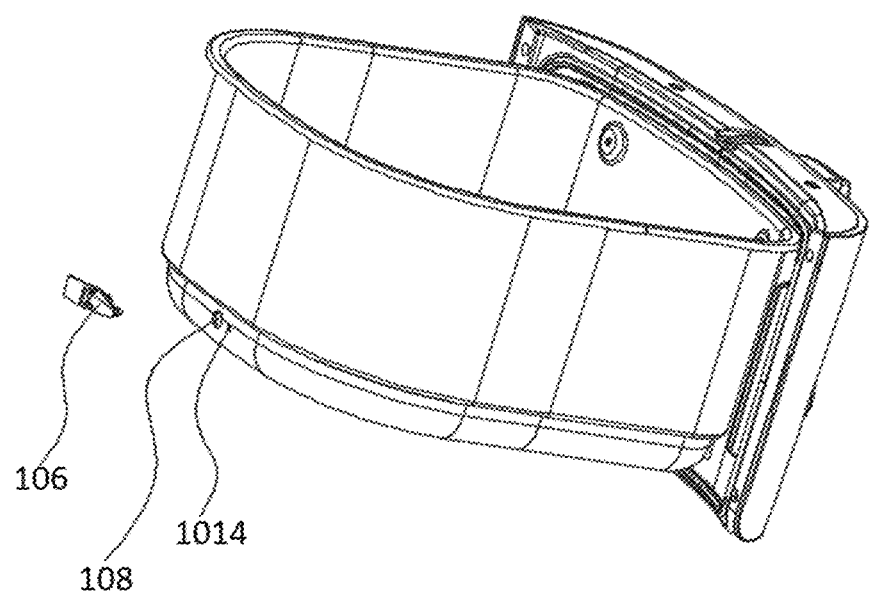
FIG. 26 is an exploded perspective structural view of the drawer-type frying pot of the third structure of the steam-type air fryer in the present disclosure.
Figure 27:
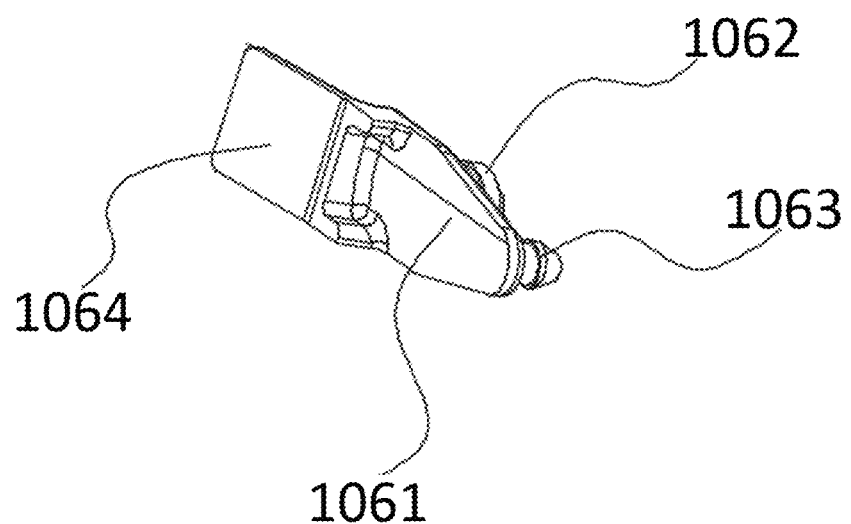
FIG. 27 is a perspective structural view of a soft plug of the third structure of the steam-type air fryer in the present disclosure.

As shown in FIGS. 18-20, the present disclosure provides a steam-type air fryer with high thermal efficiency, including a body 1, the body 1 is provided therein with a lower core 202, the cooking cavity 4 is formed in the lower core 202, and the body 1 is further provided therein with a heating element 208 for heating a water flow entering the heating element 208 to form hot steam which is introduced into the cooking cavity 4. The cooking cavity 4 is provided therein with a heating plate 207, and the heating plate 207 and the heating element 208 are in thermal conduction connection to heat the steam condensate water in the cooking cavity 4 to form steam.

The heating element 208 herein may be a steam generator, and may also be other heating components that can heat and evaporate water, wherein the heating plate 207 may be provided at the bottom of the cooking cavity 4 to facilitate collection of condensate water.

EMBODIMENTS

The bottom of the lower core 202 is provided with a counterbore 2010, and the heating plate 207 is embedded and mounted in the counterbore 2010 so as to facilitate the convergence of condensate water, meanwhile, a lower end of the heating plate 207 is closely provided with a heating element cover plate 209, the heating element cover plate 209 is mounted at an upper side of the heating element 208, then the heating element cover plate 209 may uniformly transfer the heat generated by the heating element 208 to the heating plate 207.

In order to improve the sealability of mounting, a bottom edge of the heating plate 207 is provided with a folded edge 2013 horizontally extending outward, and a first sealing ring 2012 is mounted between an upper end portion of the folded edge 2013 and a side wall of the counterbore 2010. Such structure has good sealability, and the sealing ring is not easily loosened.

Besides, an upper side of the heating element 208 is provided with a sealing groove, and a second sealing ring 2014 embedded into the sealing groove is mounted between the heating element cover plate 209 and the heating element 208, then the second sealing ring 2014 is positioned by the sealing groove.

The hot steam generated by the heating element 208 is sprayed into the cooking cavity through a steam nozzle 103 on the side wall of the cooking cavity, the cooking cavity is provided therein with a drawer-type frying pot 002, and the steam nozzle 103 passes through the lower core 202 and a side wall of the drawer-type frying pot 002 in sequence. Such a structure may directly introduce the hot steam into the drawer-type frying pot 002 to directly act on the food, thus improving the utilization rate of steam.

The heating element 208 has one end connected to the steam nozzle 103 through the steam pipe 206, and the other end connected to the water tank 04 on the body 1 through the water pipe and the water pump. The heating plate 207 and the heating element 208 are both provided on a side of the bottom of the lower core 202 close to the steam nozzle 103, because the side close to the steam nozzle 103 easily collects condensate water.

As shown in FIGS. 21-27, the present disclosure provides an air fryer ensuring food clean, including a body 1, wherein the body 1 is provided therein with a cooking cavity 4, the cooking cavity 4 is provided therein with a drawer-type frying pot 002, the body 1 is provided with a steam generator for forming hot steam that is introduced into the drawer-type frying pot 002, and a lower part of the drawer-type frying pot 002 is provided with a drain port 108, for discharging steam condensate water in the drawer-type frying pot 002.

In the above, the drain port 108 is in a trepanning structure which is opened and closed by a hole sealing member.

Embodiment 1

The hole sealing member is a plug 109, and the plug 109 may be plugged into the drain port 108 and pulled out from the drain port 108.

In the above, the plug 109 includes a columnar main body 1091, an edge position of an upper end surface of the columnar main body 1091 is provided with a conical guide surface 1094 being in an annular shape, a side wall of the columnar main body 1091 is provided with a clamping groove 1093 being in an annular shape, configured to be snap-fitted with the drain port 108. One end of the columnar main body 1091 is provided with an epitaxial force bearing portion 1092, an inner recess 1095 being in an annular shape is provided between the epitaxial force bearing portion 1092 and the columnar main body 1091, then the snap-fit positioning of the plug 109 may be realized through the clamping groove 1093, and the epitaxial force bearing portion 1092 facilitates the operation of inserting the plug 109 into the drain port 108 and pulling the plug out of the drain port 108. The conical guiding surface 1094 has a guiding effect, which facilitates the guided insertion of the plug 109.

Embodiment 2

The hole sealing member is a translatable sealing block 1011 provided below the drain port 108, and the sealing block 1011 is embedded into a position-limiting block 1010 at the bottom of the drawer-type frying pot 002 to translate so as to close or open the drain port 108. The position-limiting block 1010 is provided with a through hole that penetrates up and down, for the condensate water in the drain port 108 to flow down.

Meanwhile, one side of the drawer-type frying pot 002 is provided with the handle 0015, the handle 0015 is provided with a shift block 1013 that can slide left and right, the shift block 1013 is connected to the sealing block 1011 through a connecting rod 1012, and the sliding of the sealing block 1011 is controlled by the sliding of the shift block 1013. Such a structure may make it convenient that the drain port 108 may be quickly opened when the drawer-type frying pot 002 is lifted by the handle 107.

Embodiment 3

The drain port 108 is provided on a side wall of the lower part of the drawer-type frying pot 002, and the drain port 108 is sealed by a soft plug 106.

One side of the drain port 108 is provided with a soft plug fixing hole 1014. The soft plug 106 includes a connecting main body 1061, a second connecting post 1063 and a sealing insertion post 1062, wherein the second connecting post 1063 and the sealing insertion post 1062 are arranged side by side at one side of the connecting main body 1061, the second connecting post 1063 is inserted into the soft plug fixing hole 1014, the sealing insertion post 1062 is inserted into the drain port 108, and one end of the connecting main body 1061 is provided with an extending tab 1064. In use, the sealing insertion post 1062 is pulled out from the drain port 108, then water in the drawer-type frying pot 002 may be poured out just by slightly inclining the drawer-type frying pot 002.

Embodiment 4

The side wall of the cooking cavity 4 is provided with a steam nozzle 103 connected to the steam generator, and the steam nozzle 103 passes through the cooking cavity 4 and the side wall of the drawer-type frying pot 002, so that the steam nozzle 103 may directly spray hot steam into the drawer-type frying pot 002 to directly act on the food, thus effectively utilizing the hot steam.

Meanwhile, the drain port 108 on the drawer-type frying pot 002 is provided at a side of the bottom of the drawer-type frying pot 002 close to the steam nozzle 103, then the condensate water collected at this position may be quickly discharged.

Embodiment 5

The bottom of the body 1 is mounted with a detachable waste water box 105, and a bottom surface of the cooking cavity 4 is inclined towards the position of the waste water box 105, so that the steam condensate water at the bottom of the cooking cavity 4 flows into the waste water box 105 through the sewage discharge opening, further keeping the interior of the cooking cavity 4 clean.

In addition, the drawer-type frying pot 002 is internally erected with a frying board 006 for placing food, and the steam nozzle 103 is provided at a position above the frying board 006.

Although the present disclosure has been described above with reference to the embodiments, various improvements may be made to the present disclosure and components therein may be replaced by equivalents, without departing from the scope of the present disclosure. In particularly, as long as there is no structural conflict, various features in the embodiments disclosed in the present disclosure may be used in combination with each in any manner, while these combinations are not exhaustively described in the present description only for the sake of saving spaces and resources. Therefore, the present disclose is not restricted to specific embodiments disclosed herein, but covers all technical solutions falling within the scope of the claims.

INDUSTRIAL APPLICABILITY

The steam-type air fryer provided in the present disclosure may reduce the temperature of the exhaust gas to prevent the user from being burnt by too high temperature; the guiding component is provided, which may guide the high-temperature steam from the steam outlet to the position of the air outlet, and may be smoothly mixed with cold air discharged from the air outlet; the condensate water formed by condensation of water vapor at the air outlet of the air guide cover may be blocked by the protruding retainer at the lower part of the air guide cover, and flows back into the air fryer, and finally is guided to the bottom of the cooking cavity to flow into the waste water collecting box, so preventing the condensate water from flowing onto the worktop; the air outlet on the air outlet hood has a spiral shape, which may achieve a better cooling effect, and after flowing out of the air outlet hood, the steam and the cold air may be mixed to rapidly reduce the steam temperature, without affecting the discharge of the steam; the water outlet seat extending upward is provided in the water tank, and is inserted and fitted with the water outlet pipe on the water tank seat to form the hermetic water outlet passage, which may ensure that when the water tank is removed from the water tank seat, even if there is water in the water tank, the water will not flow out through the water tank seat outlet due to gravity, thus ensuring the practicability of the product; the cover plate is detachably sealed and clamped on the water tank, and may be monolithically removed to facilitate cleaning the water tank; the water adding cover is detachably sealed and clamped on the cover plate to facilitate adding water to the water tank; the steam generated by the steam generator in the air fryer enters the steam inlet seat via the steam inlet pipe, the steam in the steam inlet seat flows through an internal channel to the spray head of the frying basket, and the steam is sprayed into the frying basket via the spray head to achieve steam cooking; the spray head sealing ring is provided on the steam inlet seat to ensure that the steam completely flows into the spray head; meanwhile, the diameter of the spray head sealing ring is larger than the steam inlet of the spray head, thus ensuring that the flow of steam is not affected even if the position of frying basket is not quite proper; the bottom of the steam inlet seat is provided with the compression spring, so that the steam inlet seat has an upward tension, thereby ensuring that the sealing lip of the spray head sealing ring can be pressed against the bottom of the frying basket to achieve sealing; the frying board is provided inside the frying basket, the spray head is located below the frying board, the steam injecting port of the spray head is provided close to the frying board, and the steam may enter the upper part of the frying basket through the opening in the frying board to cook food; the heating plate is provided in the cooking cavity, and steam condensate water may be heated again through heat dissipation of the heating element (steam generator), so as to form steam in a second time, thereby improving the utilization rate of heat; the heating plate is embedded into the concave counterbore at the bottom, thus the steam condensate water may be better collected and heated; the hermetic fit and connection between the heating element, the heating element cover plate, and the heating plate prevent water leakage; for the air fryer having a steam function, the drain port is provided at the bottom of the inner drawer-type frying pot, then condensate water in the pot may be discharged, thereby preventing the food from being contaminated by the condensate water; the hole sealing member is provided at the drain port at the bottom of the drawer-type frying pot, and before the food is taken out, the drain port may be opened to discharge condensate water in time; and the steam condensate water may flow along the bottom of the cooking cavity to the sewage discharge opening and be discharged into the waste water box.

What is claimed is:

1. A steam-type air fryer, comprising: a body shell and an air outlet structure, wherein the body shell is provided therein with a cooking cavity, a steam generator in the body shell generates hot steam which is introduced into the cooking cavity, the cooking cavity is provided with an air outlet hole for residual steam to be discharged, a cold wind passage into which external cold air enters is formed between the cooking cavity and the body shell, wherein the body shell is provided with an air outlet hood, an air outlet hood seat is mounted at an inner side of the air outlet hood, a steam discharge passage connected to the air outlet hole is provided in the air outlet hood, a cold air passage in communication with the cold wind passage is formed between the air outlet hood and the air outlet hood seat, the cold air passage is arranged around the steam discharge passage, a steam outlet in communication with the steam discharge passage is provided in a middle of the air outlet hood, an air outlet in communication with the cold air passage is provided around the steam outlet, and the steam outlet is provided with a guiding component for guiding high-temperature steam, which is discharged from the steam outlet, to the air outlet; wherein the air outlet hood comprises a mask sealing up an opening in the body shell and a steam discharge pipe, acting as the steam discharge passage, provided in a middle of the mask, wherein the steam discharge pipe is in communication with the air outlet hole, the steam discharge passage is inside the steam discharge pipe, and the mask is provided with the air outlet.

2. The steam-type air fryer according to claim 1, wherein the guiding component is a baffle plate, one side of the baffle plate is fixed at a front end of the steam outlet by a first connecting post, and the baffle plate guides and diffuses the hot steam discharged from the steam outlet to a position of the air outlet.

3. The steam-type air fryer according to claim 1, wherein an edge of the mask is provided with several position-limiting clamping plates extending radially, wherein the position-limiting clamping plates abut on an inner side of the opening in the body shell.

4. The steam-type air fryer according to claim 1, wherein the steam-type air fryer further comprises a water inlet structure, wherein an upper end of the body shell is provided with a water tank seat, the water tank seat is detachably provided with a water tank, wherein the water tank is provided therein with a water outlet seat extending upward, the water tank seat is provided with a water outlet pipe corresponding to the water outlet seat, wherein when the water tank is mounted on the water tank seat, the water outlet pipe is inserted into the water outlet seat, and a hermetic water outlet passage is provided in the water outlet seat, wherein the hermetic water outlet passage communicates the water outlet pipe and a bottom of the water tank.

5. The steam-type air fryer according to claim 4, wherein the water outlet seat extends upward from the bottom of the water tank to an upper part of the water tank, the hermetic water outlet passage in the water outlet seat is communicated with the bottom of the water tank through a water inlet at the bottom of the water tank, and a water outlet of the hermetic water outlet passage is located at an upper part of the water outlet seat.

6. The steam-type air fryer according to claim 5, wherein a top portion of the water outlet seat is provided with a sealing cover integrally or detachably connected to the water outlet seat, and at least part of the hermetic water outlet passage is formed between the water outlet seat and the sealing cover.

7. The steam-type air fryer according to claim 6, wherein when the water tank is mounted on the water tank seat, the water outlet pipe is inserted into the water outlet seat, and an inlet of the water outlet pipe is located at a water outlet of the hermetic water outlet passage, and is hermetically connected by a sealing gasket.

8. The steam-type air fryer according to claim 1, further comprising a steam inlet structure, wherein the cooking cavity is provided therein with a drawer-type frying basket, wherein the drawer-type frying basket is provided therein with a spray head, and a bottom of the body shell is mounted with a steam inlet seat corresponding to the spray head, and the steam generated by the steam generator in the body shell is introduced into the steam inlet seat and enters the spray head through the steam inlet seat, so as to be sprayed into the drawer-type frying basket.

9. The steam-type air fryer according to claim 8, wherein an upper end of the steam inlet seat is mounted with a spray head sealing ring being in contact with a bottom of the drawer-type frying basket.

10. The steam-type air fryer according to claim 9, wherein the upper end of the steam inlet seat is provided with a retainer in an annular shape, the spray head sealing ring covers the retainer and is fitted with the retainer in an inlaying manner, and an upper end of the spray head sealing ring is provided with a sealing lip in an annular shape at a position corresponding to the retainer, and the sealing lip is fitted with the bottom of the drawer-type frying basket in sealing.

11. The steam-type air fryer according to claim 10, wherein a diameter of the spray head sealing ring is larger than that of a steam inlet at a bottom of the spray head.

12. The steam-type air fryer according to claim 1, wherein the body shell is provided therein with a lower core, the cooking cavity is formed in the lower core, and the body shell is further provided therein with a heating element, which is configured to heat a water flow entering the heating element to form hot steam which is introduced into the cooking cavity, wherein the cooking cavity is provided therein with a heating plate, and the heating plate and the heating element are in thermal conduction connection to each other, so as to heat a steam condensate water in the cooking cavity to form steam.

13. The steam-type air fryer according to claim 12, wherein the heating plate is provided at a bottom of the cooking cavity.

14. The steam-type air fryer according to claim 13, wherein a bottom of the lower core is provided with a counterbore, and the heating plate is embedded in the counterbore.

15. The steam-type air fryer according to claim 14, wherein a lower end of the heating plate is closely arranged with a heating element cover plate, and the heating element cover plate is mounted at an upper side of the heating element.

16. The steam-type air fryer according to claim 1, wherein the cooking cavity is provided therein with a drawer-type frying basket, the body shell is provided with the steam generator, which is configured to form hot steam that is introduced into the drawer-type frying basket, wherein a lower part of the drawer-type frying basket is provided with a drain port, for steam condensate water in the drawer-type frying basket to be discharged.

17. The steam-type air fryer according to claim 16, wherein the drain port is in a trepanning structure, which is opened and closed by a hole sealing member.

18. The steam-type air fryer according to claim 17, wherein the hole sealing member is a plug, wherein the plug is able to be plugged into the drain port and pulled out from the drain port.

19. The steam-type air fryer according to claim 18, wherein the plug comprises a columnar main body, an edge position of an upper end surface of the columnar main body is provided with a conical guide surface in an annular shape, a side wall of the columnar main body is provided with a clamping groove in an annular shape, which is configured to be snap-fitted with the drain port, one end of the columnar main body is provided with an epitaxial force bearing portion, and an inner recess in an annular shape is provided between the epitaxial force bearing portion and the columnar main body.

* * * * *